United States Patent
Katayama et al.

(10) Patent No.: US 10,666,551 B2
(45) Date of Patent: May 26, 2020

(54) CONTROL NODE AND PATH CONTROL SYSTEM

(71) Applicant: NTT DOCOMO, INC., Chiyoda-ku (JP)

(72) Inventors: Youhei Katayama, Chiyoda-ku (JP); Ryousuke Kurebayashi, Chiyoda-ku (JP); Shigeru Iwashina, Chiyoda-ku (JP); Motoshi Tamura, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/063,340

(22) PCT Filed: Feb. 13, 2017

(86) PCT No.: PCT/JP2017/005103
§ 371 (c)(1),
(2) Date: Jun. 18, 2018

(87) PCT Pub. No.: WO2017/145838
PCT Pub. Date: Aug. 31, 2017

(65) Prior Publication Data
US 2018/0367447 A1 Dec. 20, 2018

(30) Foreign Application Priority Data
Feb. 23, 2016 (JP) .................................. 2016-032098

(51) Int. Cl.
*H04L 12/707* (2013.01)
*H04L 12/751* (2013.01)
(Continued)

(52) U.S. Cl.
CPC ............... *H04L 45/24* (2013.01); *H04B 7/14* (2013.01); *H04L 45/02* (2013.01); *H04L 45/54* (2013.01); *H04L 45/745* (2013.01)

(58) Field of Classification Search
CPC .................................. H04L 45/24; H04B 7/14
See application file for complete search history.

(56) References Cited

U.S. PATENT DOCUMENTS

2008/0067240 A1* 3/2008 Nakano ................. G06Q 20/06
235/380
2009/0141659 A1* 6/2009 Martin ................ H04L 41/0213
370/256

(Continued)

FOREIGN PATENT DOCUMENTS

JP 2014-236234 A 12/2014

OTHER PUBLICATIONS

English translation of the International Preliminary Report on Patentability and Written Opinion dated Sep. 7, 2018 in PCT/JP2017/005103.

(Continued)

*Primary Examiner* — Zhensheng Zhang
(74) *Attorney, Agent, or Firm* — Oblon, McClelland, Maier & Neustadt, L.L.P.

(57) ABSTRACT

A C-plane device in a path control system comprises: a storage unit storing designation information designating search key information of a node used as a search key determining a transmission destination and part information indicating a packet part in which the search key information is included; and a setting unit, in a case in which a new node is connected to the U-plane device, acquires node information relating to the new node, extracts search key information of the new node on the basis of the acquired node information and the stored designation information, and, in a case in which, in a packet received by the U-plane device, (Continued)

the search key information of the new node is included in a packet part indicated by the part information, sets a transmission destination of the packet for each of at least a part of U-plane devices.

7 Claims, 26 Drawing Sheets

(51) Int. Cl.
*H04L 12/741* (2013.01)
*H04B 7/14* (2006.01)

(56) References Cited

U.S. PATENT DOCUMENTS

| | | |
|---|---|---|
| 2009/0190521 A1 | 7/2009 | Horn et al. |
| 2009/0190522 A1 | 7/2009 | Horn et al. |
| 2011/0261722 A1* | 10/2011 | Awano .................. H04L 45/34 370/254 |
| 2014/0219281 A1 | 8/2014 | Awano |

OTHER PUBLICATIONS

International Search Report dated May 9, 2017 in PCT/JP2017/005103 filed Feb. 13, 2017.
Extended European Search Report dated Feb. 11, 2019 in European Patent Application No. 17756279.0. citing documents AA and AB therein, 13 pages.

* cited by examiner

| PART INFORMATION | DESIGNATION INFORMATION |
|---|---|
| 64 BITS FROM START OF USER PACKET PART | UN 3 IDENTIFICATION CODE |

(b)

| U-PLANE DEVICE 2 IDENTIFIER | U-PLANE DEVICE 2 IDENTIFIER |
|---|---|
| U-PLANE DEVICE 2-1 | U-PLANE DEVICE 2-2 |
| U-PLANE DEVICE 2-3 | U-PLANE DEVICE 2-2 |

(c)

| UN 3 IDENTIFIER | U-PLANE DEVICE 2 IDENTIFIER OF CONNECTION POINT | UN 3 IDENTIFICATION CODE |
|---|---|---|
| UN3-1 | U-PLANE DEVICE 2-1 | 0x 0000 0000 0000 0001 |
| UN3-3 | U-PLANE DEVICE 2-3 | 0x 0000 0000 0000 0003 |
| UN3-4 | U-PLANE DEVICE 2-3 | 0x 0000 0000 0000 0004 |
| UN3-2 | U-PLANE DEVICE 2-2 | 0x 0000 0000 0000 0002 |
| UN3-2 | U-PLANE DEVICE 2-2 | 0x 0000 0000 0000 0005 |

Fig.5

| U-PLANE DEVICE 2 IDENTIFIER | PACKET SEARCH CONDITION | TRANSMISSION DESTINATION DEVICE IDENTIFIER |
|---|---|---|
| U-PLANE DEVICE 2-1 | 64 BITS FROM START OF USER PACKET PART=0x 0000 0000 0000 0001 ; | UN3-1 |
|  | 64 BITS FROM START OF USER PACKET PART=0x 0000 0000 0000 0002 ; | U-PLANE DEVICE 2-2 |
|  | 64 BITS FROM START OF USER PACKET PART=0x 0000 0000 0000 0003 ; | U-PLANE DEVICE 2-2 |
|  | 64 BITS FROM START OF USER PACKET PART=0x 0000 0000 0000 0004 ; | U-PLANE DEVICE 2-2 |
|  | 64 BITS FROM START OF USER PACKET PART=0x 0000 0000 0000 0005 ; | U-PLANE DEVICE 2-2 |
| U-PLANE DEVICE 2-3 | 64 BITS FROM START OF USER PACKET PART=0x 0000 0000 0000 0001 ; | U-PLANE DEVICE 2-2 |
|  | 64 BITS FROM START OF USER PACKET PART=0x 0000 0000 0000 0002 ; | U-PLANE DEVICE 2-2 |
|  | 64 BITS FROM START OF USER PACKET PART=0x 0000 0000 0000 0003 ; | UN3-3 |
|  | 64 BITS FROM START OF USER PACKET PART=0x 0000 0000 0000 0004 ; | UN3-4 |
|  | 64 BITS FROM START OF USER PACKET PART=0x 0000 0000 0000 0005 ; | U-PLANE DEVICE 2-2 |
| U-PLANE DEVICE 2-2 | 64 BITS FROM START OF USER PACKET PART=0x 0000 0000 0000 0001 ; | U-PLANE DEVICE 2-1 |
|  | 64 BITS FROM START OF USER PACKET PART=0x 0000 0000 0000 0002 ; | UN3-2 |
|  | 64 BITS FROM START OF USER PACKET PART=0x 0000 0000 0000 0003 ; | U-PLANE DEVICE 2-3 |
|  | 64 BITS FROM START OF USER PACKET PART=0x 0000 0000 0000 0004 ; | U-PLANE DEVICE 2-3 |
|  | 64 BITS FROM START OF USER PACKET PART=0x 0000 0000 0000 0005 ; | UN3-2 |

| FIRST 64 BITS | PAYLOAD PART |
|---|---|
| 0x 0000 0000 0000 0001 | |

(b)

| FIRST 64 BITS | PAYLOAD PART |
|---|---|
| 0x 0000 0000 0000 0002 | |

(c)

| FIRST 64 BITS | PAYLOAD PART |
|---|---|
| 0x 0000 0000 0000 0003 | |

(d)

| FIRST 64 BITS | PAYLOAD PART |
|---|---|
| 0x 0000 0000 0000 0004 | |

(e)

| FIRST 64 BITS | PAYLOAD PART |
|---|---|
| 0x 0000 0000 0000 0005 | |

| VIRTUAL NETWORK IDENTIFIER | PART INFORMATION | DESIGNATION INFORMATION |
|---|---|---|
| VIRTUAL NETWORK 1 | 64 BITS FROM START OF USER PACKET PART | UN 3v IDENTIFICATION CODE |
| VIRTUAL NETWORK 2 | 4 BITS FROM START OF USER PACKET PART = 4 AND 32 BITS FROM 128-TH BIT OF USER PACKET PART | UN 3v IDENTIFICATION CODE |

(b)

| VIRTUAL NETWORK IDENTIFIER | U-PLANE DEVICE 2v IDENTIFIER | U-PLANE DEVICE 2v IDENTIFIER |
|---|---|---|
| VIRTUAL NETWORK 1 | U-PLANE DEVICE 2v-1 | U-PLANE DEVICE 2v-2 |
| | U-PLANE DEVICE 2v-3 | U-PLANE DEVICE 2v-2 |
| VIRTUAL NETWORK 2 | U-PLANE DEVICE 2v-1 | U-PLANE DEVICE 2v-2 |
| | U-PLANE DEVICE 2v-3 | U-PLANE DEVICE 2v-2 |

(c)

| UN 3v IDENTIFIER | U-PLANE DEVICE 2v IDENTIFIER OF CONNECTION POINT | VIRTUAL NETWORK IDENTIFIER | UN3v IDENTIFICATION CODE |
|---|---|---|---|
| UN3v-1 | U-PLANE DEVICE 2v-1 | VIRTUAL NETWORK 1 | 0x 0000 0000 0000 0001 |
| | | VIRTUAL NETWORK 2 | 0x 0100 0001 |
| UN3v-3 | U-PLANE DEVICE 2v-3 | VIRTUAL NETWORK 1 | 0x 0000 0000 0000 0003 |
| UN3v-4 | U-PLANE DEVICE 2v-3 | VIRTUAL NETWORK 2 | 0x 0100 0004 |
| UN3v-2 | U-PLANE DEVICE 2v-2 | VIRTUAL NETWORK 1 | 0x 0000 0000 0000 0002 |
| | | VIRTUAL NETWORK 2 | 0x 0101 0002 |

Fig.15

| VIRTUAL NETWORK IDENTIFIER | U-PLANE DEVICE 2v IDENTIFIER | PACKET SEARCH CONDITION | TRANSMISSION DESTINATION DEVICE IDENTIFIER |
|---|---|---|---|
| VIRTUAL NETWORK 1 | U-PLANE DEVICE 2v-1 | 64 BITS FROM START OF USER PACKET PART =0x 0000 0000 0000 0001 ; | UN3v-1 |
| | | 64 BITS FROM START OF USER PACKET PART =0x 0000 0000 0000 0002 ; | U-PLANE DEVICE 2v-2 |
| | | 64 BITS FROM START OF USER PACKET PART =0x 0000 0000 0000 0003 ; | U-PLANE DEVICE 2v-2 |
| | U-PLANE DEVICE 2v-3 | 64 BITS FROM START OF USER PACKET PART =0x 0000 0000 0000 0001 ; | U-PLANE DEVICE 2v-2 |
| | | 64 BITS FROM START OF USER PACKET PART =0x 0000 0000 0000 0002 ; | U-PLANE DEVICE 2v-2 |
| | | 64 BITS FROM START OF USER PACKET PART =0x 0000 0000 0000 0003 ; | UN3v-3 |
| | U-PLANE DEVICE 2v-2 | 64 BITS FROM START OF USER PACKET PART =0x 0000 0000 0000 0001 ; | U-PLANE DEVICE 2v-1 |
| | | 64 BITS FROM START OF USER PACKET PART =0x 0000 0000 0000 0002 ; | UN3v-2 |
| | | 64 BITS FROM START OF USER PACKET PART =0x 0000 0000 0000 0003 ; | U-PLANE DEVICE 2v-3 |
| VIRTUAL NETWORK 2 | U-PLANE DEVICE 2v-1 | 4 BITS FROM START OF USER PACKET PART = 4 AND 32 BITS FROM 128-TH BIT OF USER PACKET PART =0x 0100 0001 ; | UN3v-1 |
| ... | | ... | ... |

| VIRTUAL COMMUNICATION PATH HEADER | USER PACKET PART | |
|---|---|---|
| | FIRST 64 BITS | PAYLOAD PART |
| | 0x 0000 0000 0000 0001 | |

(b)

| VIRTUAL COMMUNICATION PATH HEADER | USER PACKET PART | | | |
|---|---|---|---|---|
| | FIRST 128 BITS | 32 BITS | OTHER HEADER PART | PAYLOAD PART |
| | | 0x 0100 0001 | | |

(c)

| VIRTUAL COMMUNICATION PATH HEADER | USER PACKET PART | |
|---|---|---|
| | FIRST 64 BITS | PAYLOAD PART |
| | 0x 0000 0000 0000 0003 | |

(d)

| VIRTUAL COMMUNICATION PATH HEADER | USER PACKET PART | | | |
|---|---|---|---|---|
| | FIRST 128 BITS | 32 BITS | OTHER HEADER PART | PAYLOAD PART |
| | | 0x 0100 0004 | | |

| ACCESS POINT NAME | DESIGNATION INFORMATION TYPE | PART INFORMATION | DESIGNATION INFORMATION |
|---|---|---|---|
| U-PLANE DEVICE 2r-2 (RENDEZVOUS NODE) | NEW PROTOCOL 1 | 64 BITS FROM START OF USER PACKET PART | UN 3r IDENTIFICATION CODE |
| U-PLANE DEVICE 2r-4 (RENDEZVOUS NODE) | IPv4 | 4 BITS FROM START OF USER PACKET PART = 4 AND 32 BITS FROM 128TH BIT OF USER PACKET PART | UN 3r IDENTIFICATION CODE |
| | IPv6 | 4 BITS FROM START OF USER PACKET PART = 6 AND 64 BITS FROM 192ND BIT OF USER PACKET PART | UN 3r IDENTIFICATION CODE |

(b)

| U-PLANE DEVICE 2r IDENTIFIER | U-PLANE DEVICE 2r IDENTIFIER |
|---|---|
| U-PLANE DEVICE 2r-1 | U-PLANE DEVICE 2r-2 |
| U-PLANE DEVICE 2r-3 | U-PLANE DEVICE 2r-2 |
| U-PLANE DEVICE 2r-1 | U-PLANE DEVICE 2r-4 |
| U-PLANE DEVICE 2r-3 | U-PLANE DEVICE 2r-4 |

(c)

| UN 3r IDENTIFIER | U-PLANE DEVICE 2r IDENTIFIER OF CONNECTION POINT | ACCESS POINT NAME | DESIGNATION INFORMATION TYPE | UN 3r IDENTIFICATION CODE |
|---|---|---|---|---|
| UN3r-1 | U-PLANE DEVICE 2r-1 | U-PLANE DEVICE 2r-2 | NEW PROTOCOL 1 | 0x 0000 0000 0000 0001 |
| UN3r-2 | U-PLANE DEVICE 2r-2 | U-PLANE DEVICE 2r-2 | NEW PROTOCOL 1 | 0x 0000 0000 0000 0000 (DEFAULT ROUTE) |
| UN3r-3 | U-PLANE DEVICE 2r-3 | U-PLANE DEVICE 2r-2 | NEW PROTOCOL 1 | 0x 0000 0000 0000 0003 |
| UN3r-4 | U-PLANE DEVICE 2r-3 | U-PLANE DEVICE 2r-4 | IPv4 | 0x 0100 0004 |
| UN3r-5 | U-PLANE DEVICE 2r-1 | U-PLANE DEVICE 2r-4 | IPv6 | 0x 0100 0000 0000 0005 |
| UN3r-6 | U-PLANE DEVICE 2r-4 | U-PLANE DEVICE 2r-4 | IPv4 | 0x 0000 0000 (DEFAULT ROUTE) |
| | U-PLANE DEVICE 2r-4 | U-PLANE DEVICE 2r-4 | IPv6 | 0x 0000 0000 0000 0000 (DEFAULT ROUTE) |

*Fig. 25*

| U-PLANE DEVICE 2r IDENTIFIER | ACCESS POINT NAME | DESIGNATION INFORMATION TYPE | PACKET SEARCH CONDITION | TRANSMISSION DESTINATION DEVICE IDENTIFIER |
|---|---|---|---|---|
| U-PLANE DEVICE 2r-1 | U-PLANE DEVICE 2r-2 | NEW PROTOCOL 1 | DEFAULT (CASE IN WHICH NONE OF SEARCH CONDITIONS MATCH) | U-PLANE DEVICE 2r-2 |
| | U-PLANE DEVICE 2r-4 | IPv4 | DEFAULT (CASE IN WHICH NONE OF SEARCH CONDITIONS MATCH) | U-PLANE DEVICE 2r-4 |
| | U-PLANE DEVICE 2r-4 | IPv6 | DEFAULT (CASE IN WHICH NONE OF SEARCH CONDITIONS MATCH) | U-PLANE DEVICE 2r-4 |
| U-PLANE DEVICE 2r-3 | U-PLANE DEVICE 2r-2 | NEW PROTOCOL 1 | DEFAULT (CASE IN WHICH NONE OF SEARCH CONDITIONS MATCH) | U-PLANE DEVICE 2r-2 |
| | U-PLANE DEVICE 2r-4 | IPv4 | DEFAULT (CASE IN WHICH NONE OF SEARCH CONDITIONS MATCH) | U-PLANE DEVICE 2r-4 |
| | U-PLANE DEVICE 2r-4 | IPv6 | DEFAULT (CASE IN WHICH NONE OF SEARCH CONDITIONS MATCH) | U-PLANE DEVICE 2r-4 |
| U-PLANE DEVICE 2r-2 | U-PLANE DEVICE 2r-2 | NEW PROTOCOL 1 | DEFAULT (CASE IN WHICH NONE OF SEARCH CONDITIONS MATCH) | UN3r-2 |
| U-PLANE DEVICE 2r-4 | U-PLANE DEVICE 2r-4 | IPv4 | DEFAULT (CASE IN WHICH NONE OF SEARCH CONDITIONS MATCH) | UN3r-6 |
| | U-PLANE DEVICE 2r-4 | IPv6 | DEFAULT (CASE IN WHICH NONE OF SEARCH CONDITIONS MATCH) | UN3r-6 |

Fig.26

| U-PLANE DEVICE 2r IDENTIFIER | ACCESS POINT NAME | DESIGNATION INFORMATION TYPE | PACKET SEARCH CONDITION | TRANSMISSION DESTINATION DEVICE IDENTIFIER |
|---|---|---|---|---|
| U-PLANE DEVICE 2r-1 | U-PLANE DEVICE 2r-2 | NEW PROTOCOL 1 | 64 BITS FROM START OF USER PACKET PART =0x 0000 0000 0000 0001 ; | UN3r-1 |
| | | | DEFAULT (CASE IN WHICH NONE OF SEARCH CONDITIONS MATCH) | U-PLANE DEVICE 2r-2 |
| | U-PLANE DEVICE 2r-4 | IPv4 | DEFAULT (CASE IN WHICH NONE OF SEARCH CONDITIONS MATCH) | U-PLANE DEVICE 2r-4 |
| | | IPv6 | 4 BITS FROM START OF USER PACKET PART = 6 AND 64 BITS FROM 192ND BIT OF USER PACKET PART =0x 0100 0000 0000 00005 | UN3r-5 |
| | | | DEFAULT (CASE IN WHICH NONE OF SEARCH CONDITIONS MATCH) | U-PLANE DEVICE 2r-4 |
| U-PLANE DEVICE 2r-3 | U-PLANE DEVICE 2r-2 | NEW PROTOCOL 1 | 64 BITS FROM START OF USER PACKET PART =0x 0000 0000 0000 0003 ; | UN3r-3 |
| | | | DEFAULT (CASE IN WHICH NONE OF SEARCH CONDITIONS MATCH) | U-PLANE DEVICE 2r-2 |
| | U-PLANE DEVICE 2r-4 | IPv4 | 4 BITS FROM START OF USER PACKET PART = 4 AND 32 BITS FROM 128TH BIT OF USER PACKET PART = 0x 0100 0004 | UN3r-4 |
| | | | DEFAULT (CASE IN WHICH NONE OF SEARCH CONDITIONS MATCH) | U-PLANE DEVICE 2r-4 |
| | | IPv6 | DEFAULT (CASE IN WHICH NONE OF SEARCH CONDITIONS MATCH) | U-PLANE DEVICE 2r-4 |
| U-PLANE DEVICE 2r-2 | U-PLANE DEVICE 2r-2 | NEW PROTOCOL 1 | 64 BITS FROM START OF USER PACKET PART =0x 0000 0000 0000 0001 ; | U-PLANE DEVICE 2r-1 |
| | | | 64 BITS FROM START OF USER PACKET PART =0x 0000 0000 0000 0003 ; | U-PLANE DEVICE 2r-3 |
| | | | DEFAULT (CASE IN WHICH NONE OF SEARCH CONDITIONS MATCH) | UN3r-2 |
| U-PLANE DEVICE 2r-4 | U-PLANE DEVICE 2r-4 | IPv4 | 4 BITS FROM START OF USER PACKET PART = 4 AND 32 BITS FROM 128TH BIT OF USER PACKET PART =0x 0100 0004 | U-PLANE DEVICE 2r-3 |
| | | | DEFAULT (CASE IN WHICH NONE OF SEARCH CONDITIONS MATCH) | UN3r-6 |
| | | IPv6 | 4 BITS FROM START OF USER PACKET PART = 6 AND 64 BITS FROM 192ND BIT OF USER PACKET PART =0x 0100 0000 0000 00005 | U-PLANE DEVICE 2r-1 |
| | | | DEFAULT (CASE IN WHICH NONE OF SEARCH CONDITIONS MATCH) | UN3r-6 |

US 10,666,551 B2

CONTROL NODE AND PATH CONTROL SYSTEM

TECHNICAL FIELD

The present invention relates to a control node performing path control of packet communication between nodes and a path control system comprising one or more relay nodes that are connected to the control node and relay packet communication.

BACKGROUND ART

Conventionally, communication systems performing path control in an evolved packet system (EPS) that is a standard of a mobile communication network are known (for example, Patent Literature 1).

CITATION LIST

Patent Literature

Patent Literature 1: Japanese Unexamined Patent Application Publication No. 2014-236234

SUMMARY OF INVENTION

Technical Problem

However, in the EPS, there are problems in that path control using identification information designated by a network company and a packet field designated by the network company cannot be performed, and flexible path control cannot be performed.

Thus, the present invention is in consideration of such problems, and an object thereof is to provide a control node and a path control system capable of performing more flexible path control.

Solution to Problem

In order to solve the problems described above, according to one aspect of the present invention, there is provided a control node in a path control system comprising the control node performing path control of packet communication between nodes and one or more relay nodes that are connected to the control node and relay the packet communication, the control node comprising: a memory storing designation information designating search key information of a node used as a search key determining a transmission destination that is a relay destination when one of the one or more relay nodes receives a packet and part information indicating a packet part in which the search key information is included. The control node, in a case in which a new node is connected to at least one of the one or more relay nodes, acquires node information relating to the new node, extracts search key information of the new node on the basis of the acquired node information and the designation information stored in the memory, and, in a case in which, in a packet received by at least one relay node among the one or more relay nodes, the search key information of the new node is included in a packet part indicated by the part information, sets a transmission destination of the packet for at least a part of the one or more relay nodes or each of all the relay nodes in a transmission path of the packet transmission.

By employing such a configuration, in a case in which a new node is connected to at least one of the one or more relay nodes and in a case in which, in a packet received by at least one relay node among the one or more relay nodes, the search key information of the new node based on the designation information stored in the memory is included in a packet part indicated by the part information, a transmission destination of the packet is set for at least a part of the one or more relay nodes or each of all the relay nodes in a transmission path of the packet transmission. In other words, on the basis of the designation information and the part information stored in the memory, a transmission destination of a packet for each relay node can be set. Accordingly, for example, when designation information and part information designated by a network company are stored in the memory, path control can be performed using the designation information and the part information designated by the network company. In other words, more flexible path control can be performed.

In addition, in the control node according to one aspect of the present invention, a plurality of pieces of search key information may be extracted when the search key information is extracted, and a transmission destination may be set for each of the plurality of pieces of extracted search key information. By employing such a configuration, a plurality of pieces of search key information can be set for the node, and thus, for example, more flexible path control such as setting a plurality of pieces of search key information in accordance with purposes and setting path control in accordance with the purposes can be performed.

In addition, in the control node according to one aspect of the present invention, insufficiency information may be dynamically generated when the search key information is extracted. By employing such a configuration, even in a case in which insufficiency information is present, search key information can be extracted more reliably, and accordingly, a transmission destination of the relay node can be set more reliably.

In addition, in the control node according to one aspect of the present invention, the memory may further store topology information relating to network topology of the one or more relay nodes, and the control node may set a transmission destination on the basis of the topology information stored in the memory. By employing such a configuration, for example, a transmission destination forming a shortest path toward a transmission destination node can be set on the basis of the topology information, and more flexible path control can be performed.

In addition, in the control node according to one aspect of the present invention, the packet communication may be performed through one virtual network among a plurality of virtual networks established on a path, the memory may store designation information and part information for each of the virtual networks, and the control node, in a case in which a new node is connected to at least one of the one or more relay nodes, acquires node information relating to the new node, extracts search key information for each virtual network of the new node on the basis of the acquired node information and the designation information for each virtual network stored in the memory, and, in a case in which, in a packet received by at least one relay node among the one or more relay nodes, the search key information for the virtual network of the new node is included in a packet part indicated by the part information for each virtual network, may set a transmission destination of the packet for each virtual network and for at least a part of the one or more relay nodes or each of all the relay nodes in a transmission path of the packet transmission. By employing such a configuration, in a packet communication network in which a plurality of virtual networks are established on a path, path control for each virtual network can be performed. In other words, more flexible path control can be performed.

In addition, in order to solve the problems described above, according to one aspect of the present invention, there is provided a path control system comprising: a control node performing path control of packet communication between nodes; and one or more relay nodes that are connected to the control node and relay the packet communication. The control node comprises a first memory storing designation information designating search key information of a node used as a search key determining a transmission destination that is a relay destination when one of the one or more relay nodes receives a packet and part information indicating a packet part in which the search key information is included and, in a case in which a new node is connected to at least one of the one or more relay nodes, acquires node information relating to the new node, extracts search key information of the new node on the basis of the acquired node information and the designation information stored in the first memory, and, in a case in which, in a packet received by at least one relay node among the one or more relay nodes, the search key information of the new node is included in a packet part indicated by the part information, generates a settings data table in which a transmission destination of the packet is set for at least a part of the one or more relay nodes or for each of all the relay nodes in a transmission path of the packet transmission and transmits the generated settings data table to the set relay node, and the relay node comprises a second memory storing the settings data table transmitted by the control node and transmits a packet received at the time of relaying on the basis of the settings data table stored in the second memory.

By employing such a configuration, in the control node, in a case in which a new node is connected to at least one of the one or more relay nodes and in a case in which, in a packet received by at least one relay node among the one or more relay nodes, the search key information of the new node based on the designation information stored in the first memory is included in a packet part indicated by the part information, a settings data table in which a transmission destination of the packet is set for at least a part of the one or more relay nodes or for each of all the relay nodes present in a transmission path of the packet transmission is generated. Then, in the relay node, the generated settings data table is stored in the second memory, and a packet received at the time of relaying is transmitted on the basis of the settings data table stored in the second memory. In other words, on the basis of the settings data table generated on the basis of the designation information and the part information stored in the first memory, a packet is transmitted in the relay node. Accordingly, for example, when designation information and part information designated by a network company are stored in the first memory, path control can be performed using the designation information and the part information designated by the network company. In other words, more flexible path control can be performed.

Advantageous Effects of Invention

More flexible path control can be performed.

BRIEF DESCRIPTION OF DRAWINGS

FIG. 4 is a diagram illustrating examples of a packet search rule table, a topology information table, and a UN specific information table.

FIG. 5 is a diagram illustrating an example of a settings data table.

FIG. 10 is a diagram illustrating an example of a packet transmitted from a node that is a transmission source in an example.

FIG. 14 is a diagram illustrating examples of a packet search rule table, a topology information table, and a UN specific information table in Modified example 1.

FIG. 15 is a diagram illustrating an example of a settings data table in Modified example 1.

FIG. 19 is a diagram illustrating an example of a packet transmitted from a node that is a transmission source in Modified example 1.

FIG. 23 is a diagram illustrating examples of a packet search rule table, a topology information table, and a UN specific information table in Modified example 2.

FIG. 25 is a diagram illustrating an example of a settings data table in Modified example 2 (initial state).

FIG. 26 is a diagram illustrating an example of a settings data table in Modified example 2.

DESCRIPTION OF EMBODIMENTS

Hereinafter, a control node and a path control system according to an embodiment will be described in detail with reference to the drawings. In description of the drawings, the same reference signs will be assigned to the same elements, and duplicate description thereof will not be presented.

Figure 1:
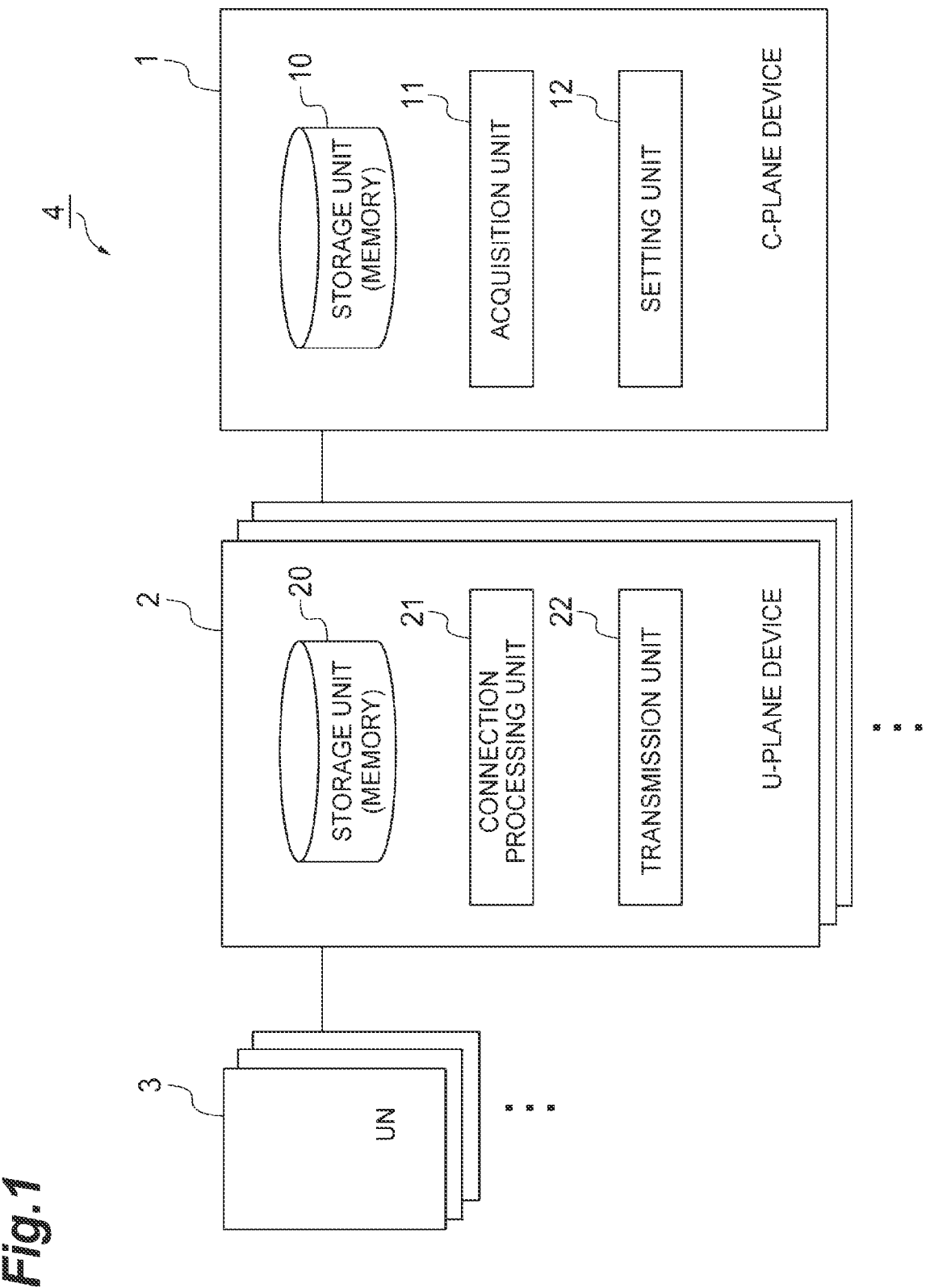
FIG. 1 is a configuration diagram of a path control system according to an embodiment of the present invention.

FIG. 1 is a system configuration diagram of a path control system 4 (path control system) according to an embodiment of the present invention. As illustrated in FIG. 1, the path control system 4 is configured to include a C-plane device 1 (control node), one or more U-plane devices 2 (relay nodes), and one or more UNs 3 (nodes). Hereinafter, the one or more U-plane devices 2 will be collectively referred to as a U-plane device 2 as is appropriate, and the one or more UNs 3 will be collectively referred to as a UN 3 as is appropriate.

The C-plane device 1 is connected to the one or more U-plane devices 2 through a network for enabling packet communication. Some or all of U-plane devices 2 among the one or more U-plane devices 2 are connected such that the U-plane devices 2 can perform mutual packet communication through a network. Each of the one or more UNs 3 can be connected to one U-plane device 2 among the one or more U-plane devices 2 through a network to enable mutual packet communication and can appropriately disconnect the communication or update the connection state. A packet-communicable network of the whole path control system 4 is constituted by using the C-plane device 1 and the network between the U-plane devices 2 and the UN 3 described above. The path control system 4, for example, may be a mobile communication system using an evolved packet system (EPS).

In this embodiment, mainly, path control of packet communication between UNs 3 is described. More specifically, the packet communication between UNs 3 is communication of packets transmitted from a UN 3 that is a transmission source to a UN 3 that is a transmission destination. The communication between the UNs 3 (nodes) is relayed by one or more U-plane devices 2. A UN 3 that is a transmission source, first, transmits a packet to a U-plane device 2 that is directly connected. The U-plane device 2 that has transmitted the packet determines a transmission destination of the packet (a determining method will be described later) and transmits the packet to the determined transmission destination. The transmission destination is another U-plane device 2 or a UN 3 that is a transmission destination. In this way, a packet transmitted from a UN 3 that is a transmission source is relayed through one or more U-plane devices 2 and finally arrives at a UN 3 that is a transmission destination. A network (including a UN 3 and a U-plane device 2) traced by a packet from the UN 3 that is a transmission source to a UN 3 that is a transmission destination is called a path.

The C-plane (control plane) device 1 is a computer device (one node in a network) performing network control such as path control of packet communication between UNs 3 that is relayed by the U-plane device 2. The C-plane device 1, for example, is a home subscriber server (HSS), a mobility management entity (MME), a policy and charging rule function (PCRF), or the like in an EPS. Details of the C-plane device 1 will be described later.

The U-plane (user plane) device 2 is a computer device (one node in a network) relaying packet communication between UNs 3 and, more specifically, is a computer device that performs packet transmission or a packet process of a network. The U-plane device 2, for example, is an evolved node B (eNB), a serving gateway (SGW), a packet data network gateway (PGW), or the like that is a node system in an EPS. Details of the U-plane device 2 will be described later.

The UN (user network) 3 collectively refers to hardware and software connected to a network constituted by the path control system 4 and groups constituted thereby (one node in a network). The UN 3, for example, may be a portable terminal, a network configured from a plurality of devices, a virtual terminal or an application operating on a portable terminal, a network managed by another network company different from a network company managing the C-plane device 1 and the U-plane devices 2, or the Internet that is connected through a network managed by another network company.

Hereinafter, each functional block of the C-plane device 1 will be described on the basis of a functional block diagram of the C-plane device 1 included in FIG. 1. As illustrated in FIG. 1, the C-plane device 1 is configured to include: a storage unit 10 (a memory or a first memory); an acquisition unit 11; and a setting unit 12.

Figure 2:
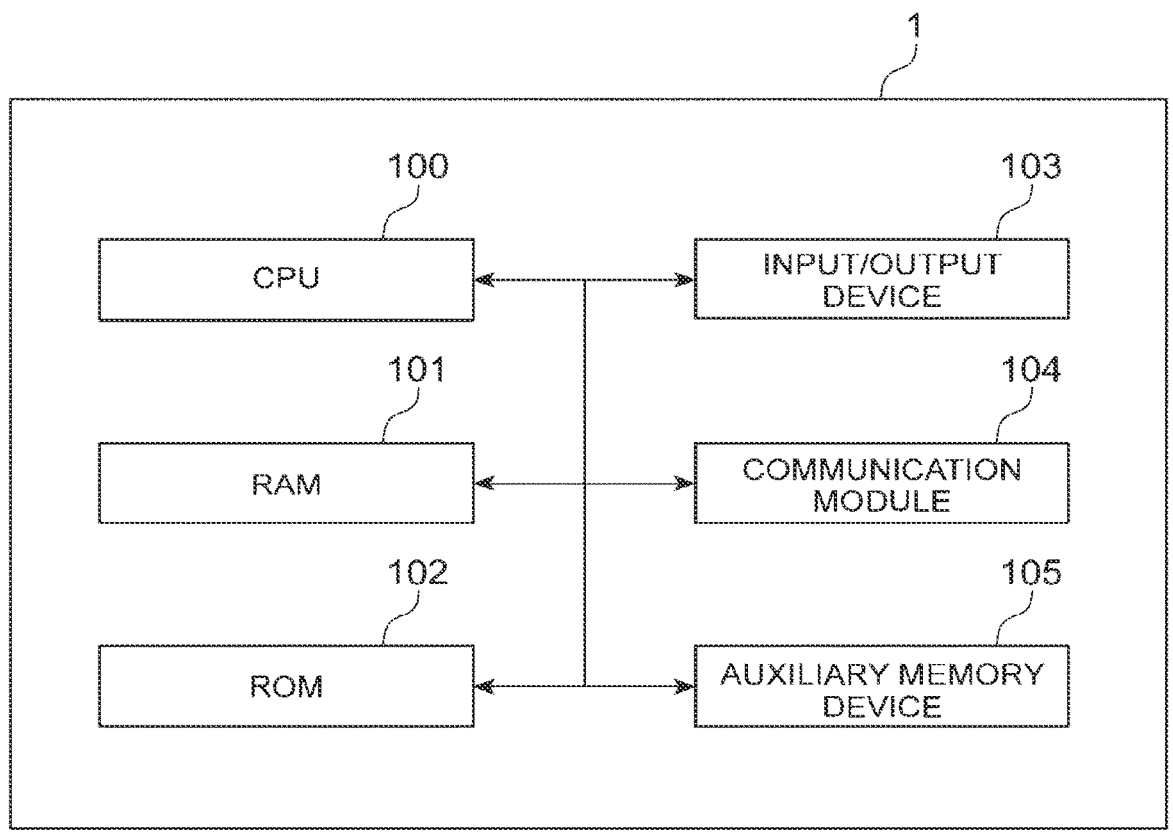
FIG. 2 is a diagram illustrating the hardware configuration of a control node according to an embodiment of the present invention.

The C-plane device 1 is configured from hardware such as a CPU and the like. FIG. 2 is a diagram illustrating one example of the hardware configuration of the C-plane device 1. The C-plane device 1 illustrated in FIG. 1, physically, as illustrated in FIG. 2, is configured as a computer system including: one or a plurality of CPUs 100; a RAM 101 and a ROM 102 that are main memory devices; an input/output device 103 such as a display; a communication module 104; an auxiliary memory device 105; and the like.

The function of each functional block of the C-plane device 1 illustrated in FIG. 1 is realized by operating the input/output device 103, the communication module 104, and the auxiliary memory device 105 under the control of the CPU 100 and reading and writing data from/into the RAM 101 by causing predetermined computer software to be read onto hardware such as the CPU 100, the RAM 101, and the like illustrated in FIG. 2.

In addition, each function may be configured to be executed by building all or some of the functions into a dedicated integrated circuit (IC) instead of executing each function illustrated in FIG. 1 using a processor such as the CPU 100. For example, by building a dedicated integrated circuit for performing image processing or communication control, the functions described above may be executed.

It is apparent that the software is broadly interpreted to mean a command, a command set, a code, a code segment, a program code, a program, a subprogram, a software module, an application, a software application, a software package, a routine, a subroutine, an object, an executable file, an execution thread, an order, a function, and the like regardless whether it is called software, firmware, middleware, a micro-code, a hardware description language, or any other name.

In addition, the software, the command, and the like may be transmitted and received through a transmission medium. For example, in a case in which software is transmitted from a website, a server, or another remote source using a wired technology such as a coaxial cable, an optical fiber cable, a twisted pair, or a digital subscriber line (DSL) and/or a wireless technology such as infrared rays or microwaves, the wired technology and/or the wireless technology are included within the definition of the transmission medium.

The storage unit 10 stores designation information used for designating search key information of the UN 3 that is used as a search key of determination of a transmission destination by the U-plane device 2 at the time of relaying a packet and part information indicating a packet part (for example, a packet field) in which the search key information is included. As will be described later, the U-plane device 2 determines a specific U-plane device 2 or a UN 3 (of a transmission destination) to which a packet is to be transmitted next at the time of relaying the received packet. In other words, a transmission destination is determined. The determination is performed on the basis of the search key information of the UN 3 (of the transmission destination) included in the received packet. FIG. 4(*a*) is a diagram illustrating an example of a packet search rule table in which the part information and the designation information stored using the storage unit 10 are associated with each other. In the table example illustrated in FIG. 4(*a*), the part information is "64 bits from the start of a user packet part." This indicates that a packet part in which search key information is included is the part having 64 bits from the start of the user packet part included in a packet. In the table example illustrated in FIG. 4(*a*), the designation information is "UN 3 identification code." This indicates designation of the use of a UN 3 identification code (an independent code used for identifying the UN 3; in this embodiment, a code of 64 bits) as search key information of the UN 3.

The designation information and the part information are assumed to be designated by a network company managing the path control system 4. For example, the C-plane device 1 may receive the designation information and the part information from a network company through the input/output device 103 as inputs and stores the input information using the storage unit 10.

The storage unit 10 may further store topology information relating to a network topology of one or more U-plane devices 2. More specifically, the network topology of one or more U-plane devices 2 is a connection form representing a manner in which the U-plane devices 2 are connected inside the path control system 4. FIG. 4(*b*) is a diagram illustrating an example of a topology information table stored using the storage unit 10. In the table example illustrated in FIG. 4(*b*), one record corresponds to a set of identifiers used for identifying U-plane devices 2 and represents that the U-plane devices 2 identified using the set of identifiers are connected together (have a connection relation). More specifically, in the table example illustrated in FIG. 4(*b*), in the path control system 4, it represents that a U-plane device 2-1 and a U-plane device 2-2 are connected, and a U-plane device 2-3 and the U-plane device 2-2 are connected.

In addition to the information described above, the storage unit 10 may store information that is temporarily generated or output information at the time of processing using the acquisition unit 11 and the setting unit 12 to be described later.

When a new UN 3 (a UN 3 that is not connected to any one of U-plane devices 2 included in the path control system 4) is connected to a U-plane device 2 or when the connection state of a UN 3 is updated, the acquisition unit 11 acquires node information relating to the UN 3. The acquisition unit 11 acquires the node information through a connection processing unit 21 of the U-plane device 2 to be described later. In the node information, UN specific information that is specific information of the UN 3 is included. The UN specific information may include all the information that is specific in particular to a user device maintained in software or hardware among specific information of the UN 3, for example, a UN 3 identifier used for identifying the UN 3, the UN 3 identification code described above and information used when the UN 3 is connected to a network constituted by the path control system 4. For example, the UN specific information may include an identifier of the U-plane device 2 to which the UN 3 is connected. The acquisition unit 11 outputs the acquired node information to the setting unit 12.

The setting unit 12 extracts search key information of the UN 3 on the basis of the node information input from the acquisition unit 11 and the designation information stored using the storage unit 10. In a case in which the designation information stored using the storage unit 10 is the table example illustrated in FIG. 4(*a*), as described above, the use of the UN 3 identification code is designated as the search key information of the UN 3, and accordingly, the setting unit 12 extracts a UN 3 identification code included in the node information input from the acquisition unit 11.

When search key information is extracted, the setting unit 12 may extract a plurality of pieces of search key information. For example, in the specific example described above, in a case in which a plurality of UN 3 identification codes are included in the node information input from the acquisition unit 11, the setting unit 12 extracts the plurality of UN 3 identification codes.

The setting unit 12 may dynamically generate insufficiency information when the search key information which is insufficient is extracted. In addition, the setting unit 12 may dynamically generate insufficiency information when search key information which is extracted on the basis of the node information and the designation information is insufficient. For example, in the specific example described above, in a case in which a UN 3 identification code included in the node information input from the acquisition unit 11 is not the original code of 64 bits but a code of 32 bits representing the same numerical value, the setting unit 12 converts the code of 32 bits into a code of 64 bits (32 "0"s that are insufficiency information are dynamically generated and added). As another example, the insufficiency information may be generated using a method of assigning a value that is larger than a largest value of the UN 3 identification code, which has already been assigned to the UN 3, by one. In addition, as a yet another example, an embodiment may be conceived in which assignment of a UN 3 identification code is requested for an external C-plane device 1 controlling the UN 3, and the value of the UN 3 identification code included in a response thereof is used.

The setting unit 12 may generate a UN specific information table in which an identifier of a UN 3, an identifier of a U-plane device 2 to which the UN 3 is connected, and search key information are associated with each other or update a record relating to a UN 3 that is newly connected for a UN specific information table stored in advance on the basis of the extracted search key information and the node information input from the acquisition unit 11. For example, when a new UN 3 is connected to the U-plane device 2, the setting unit 12 may acquire an identifier of the UN 3 included in the node information input from the acquisition unit 11 and an identifier of the U-plane device 2 and generates or updates a UN specific information table by associating these with each piece of the extracted search key information. FIG. 4(*c*) is a diagram that illustrates an example of the UN specific information table. In the table example illustrated in FIG. 4(*c*), for example, a first record represents that a UN 3 of which the identifier is "UN 3-1" is connected to a U-plane device 2 of which the identifier is "U-plane device 2-1," and search key information (UN 3 identifier code) of the UN 3 is "0x 0000 0000 0000 0001." The setting unit 12 may store the UN specific information table that has been generated or updated using the storage unit 10.

Subsequently, the setting unit 12 generates a settings data table in which a transmission destination of a packet of a case, in which extracted search key information is included in a packet part, which indicated by part information stored using the storage unit 10, of the packet received when the U-plane device 2 performs packet relay, is set for each U-plane device 2. The setting unit 12 may store the generated settings data table using the storage unit 10. In addition, the setting unit 12 may generate the settings data table for at least a part of the U-plane devices 2 or each of all the U-plane devices 2 present in a transmission path of the packet transmission. Hereinafter, a method of generating the settings data table using the setting unit 12 will be described more specifically.

More specifically, the setting unit 12 generates an example of a settings data table illustrated in FIG. 5 on the basis of the examples of the packet search rule table, the topology information table and the UN specific information table illustrated in FIG. 4. In the example of the settings data table illustrated in FIG. 5, an identifier of a U-plane device 2, a packet search condition (to be described later), and an identifier of a transmission destination device are associated with each other. Hereinafter, a method of acquiring information of each column of the example of the settings data table illustrated in FIG. 5 will be described.

First, the setting unit 12 extracts identifiers of U-plane devices 2 from the topology information table without any duplication and sets the identifiers in the first column of the example of the settings data table illustrated in FIG. 5. The setting unit 12 may extract the identifiers of the U-plane devices 2 not from the topology information table but on the basis of the identifiers of all the U-plane devices 2, to which the C-plane device 1 is connected, stored in the C-plane device 1 in advance.

Next, the setting unit 12 generates a packet search condition acquired by combining the part information of the pack search rule table and the identification information (search key information) of each UN 3 included in the UN specific information table and sets the generated packet search condition in the second column of the example of the settings data table illustrated in FIG. 5 for each of U-plane devices 2 of the first column.

In the example of the settings data table at this time point illustrated in FIG. 5, the "U-plane device 2 identifier" of the first column represents a U-plane device 2 that is a subject relaying a packet, and the "packet search condition" of the second column represents a search condition satisfied by the packet when the U-plane device 2 relays the packet. For example, a first record represents a case in which 64 bits from the start of a user packet part of a packet received by a 15-plane device 2-1 are "0x 0000 0000 0000 0001," in other words, a case in which a UN 3 that is a transmission destination is a UN 3-1. In the case of this first record, the setting unit 12 refers to the UN specific information table and determines that the U-plane device 2-1 and the UN 3-1 are connected and sets "UN 3-1" as an identifier of a transmission destination device of the third column. In addition, the packet search condition uses at least the part information and the search key information.

The setting unit 12 may set a transmission destination on the basis of the topology information stored using the storage unit 10. For example, a second record of the example of the settings data table illustrated in FIG. 5 represents a case in which the transmission destination of a packet received by the LT-plane device 2-1 is a UN 3-2. In the case of this second record, the setting unit 12, first, determines that a device to which the UN 3-2 is connected is a U-plane device 2-2 by referring to the UN specific information table and, next, determines that the determined U-plane device 2-2 and the U-plane device 2-1 that is its own device are connected by referring to the topology information table. Thus, the setting unit 12, determines that, in order to transmit a packet received by the U-plane device 2-1 to the UN 3-2 that is a transmission destination, first, it is necessary to transmit the packet to the U-plane device 2-2 and sets a "U-plane device 2-2" as an identifier of a transmission destination device of the third column. In addition, when the transmission destination is set, the setting unit 12 may calculate and set a transmission destination device that is a shortest path toward the UN 3 that is the transmission destination using a Dijkstra's algorithm, which is a known technology, or the like on the basis of the topology information table and the UN specific information table.

The setting unit 12 may set a transmission destination for each of a plurality of pieces of extracted search key information. For example, in the example of the UN specific information table illustrated in FIG. 4(c), two UN 3 identification codes ("0x 0000 0000 0000 0002" and "0x 0000 0000 0000 0005") are set for the U-plane device 2-2, and, on the basis of the UN specific information table, in the example of the settings data table illustrated in FIG. 5, transmission destinations are set by the setting unit 12 for the two UN 3 identification codes (for example, the second record and the fifth record). The method of generating the settings data table using the setting unit 12 is as described above.

The setting unit 12 performs setting by transmitting the generated settings data table to each U-plane device 2. The setting unit 12 may transmit the generated settings data table to all the U-plane devices 2 or may transmit a record for each U-plane device 2 in the generated settings data table to the U-plane device 2. (For example, all the records in which the first column is the "U-plane device 2-1" in the settings data table are transmitted to the U-plane device 2-1, and all the records of the "U-plane device 2-2" are transmitted to the U-plane device 2-2, and the like).

Subsequently, referring back to FIG. 1, each functional block of the U-plane device 2 will be described on the basis of the functional block diagram of the U-plane device 2 included in FIG. 1. As illustrated in FIG. 1, the U-plane device 2 is configured to include a storage unit 20 (a memory or a second memory), a connection processing unit 21, and a transmission unit 22.

Figure 3:
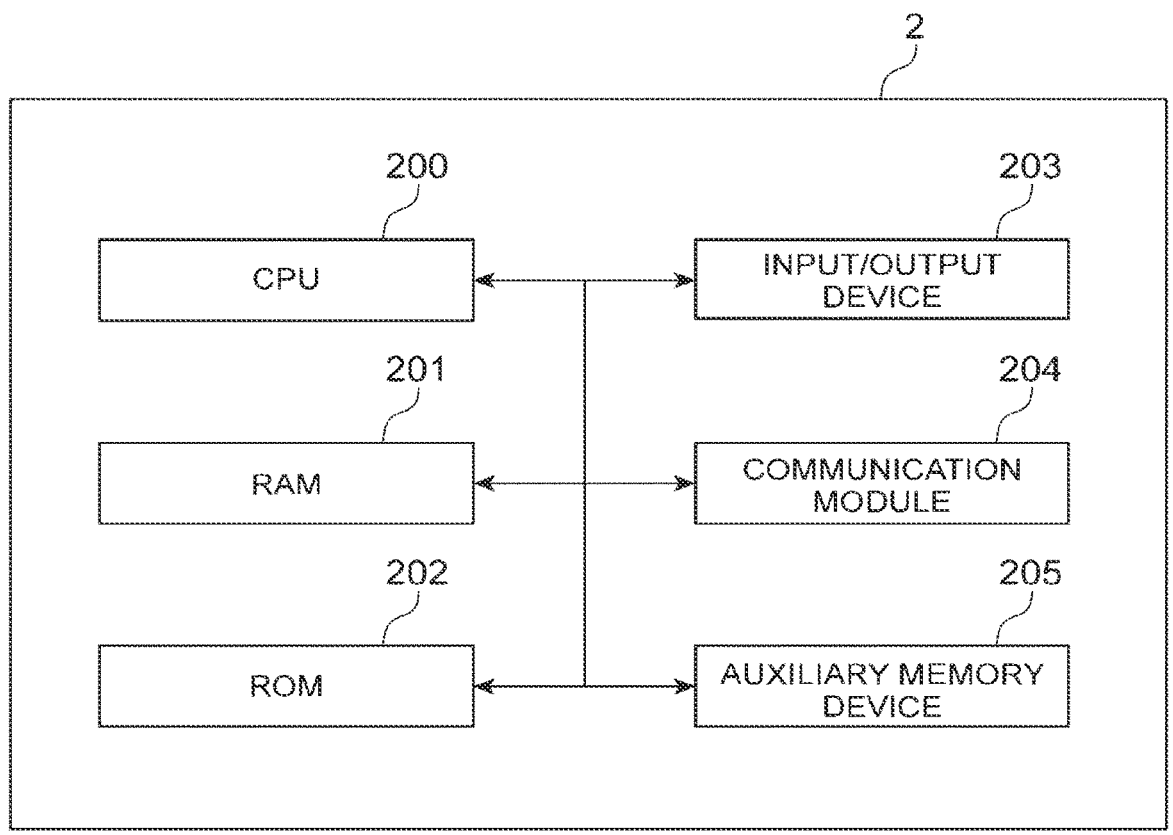
FIG. 3 is a diagram illustrating the hardware configuration of a relay node according to an embodiment of the present invention.

The U-plane device 2 is configured from hardware such as a CPU and the like. FIG. 3 is a diagram illustrating one example of the hardware configuration of the U-plane device 2. The U-plane device 2 illustrated in FIG. 1, physically, as illustrated in FIG. 3, is configured as a computer system including: one or a plurality of CPUs 200; a RAM 201 and a ROM 202 that are main memory devices; an input/output device 203 such as a display; a communication module 204; an auxiliary memory device 205; and the like.

The function of each functional block of the U-plane device 2 illustrated in FIG. 1 is realized by operating the input/output device 203, the communication module 204, and the auxiliary memory device 205 under the control of the CPU 200 and reading and writing data from/into the RAM 201 by causing predetermined computer software to be read onto hardware such as the CPU 200, the RAM 201, and the like illustrated in FIG. 3.

In addition, each function may be configured to be executed by building all or some of the functions into a dedicated integrated circuit (IC) instead of executing each function illustrated in FIG. 1 using a processor such as the CPU 200. For example, by building a dedicated integrated circuit for performing image processing or communication control, the functions described above may be executed.

The storage unit 20 stores a settings data table transmitted by the setting unit 12. In addition, the settings data table transmitted by the setting unit 12 may be received by a reception unit not illustrated in the drawing, and the received settings data table may be stored by the storage unit 20.

The connection processing unit 21 performs a process of connecting with the UN 3. More specifically, the connection processing unit 21 receives a new connection request from the UN 3 or receives a request for updating a connection state in the connection state of already being connected with the UN 3. Then, when a connection request or an update request is received, the connection processing unit 21 establishes a connection with the UN 3. In addition, when the connection request or the update request is received, the connection processing unit 21 receives the node information described above from the UN 3. In addition, the connection processing unit 21 may receive information of a part of the node information from the UN 3 and generate node information on the basis of the information of the part. The connection processing unit 21 transmits the node information that has been received or generated to the acquisition unit 11 of the C-plane device 1.

The transmission unit 22 transmits a packet that has been received at the time of relaying the packet on the basis of the settings data table stored using the storage unit 20. More specifically, the transmission unit 22, first, acquires records in which the identifier of the U-plane device 2 is the identifier of its own device in the settings data table stored using the storage unit 20. Next, the transmission unit 22 extracts a record satisfying a packet search condition included in a record among the acquired records for the packet transmitted from a transmission source device (another U-plane device 2 or the UN 3) and acquires an identifier of a transmission destination device of the record. Then, the transmission unit 22 transmits the packet to the transmission destination device corresponding to the acquired identifier of the transmission destination device.

Figure 6:
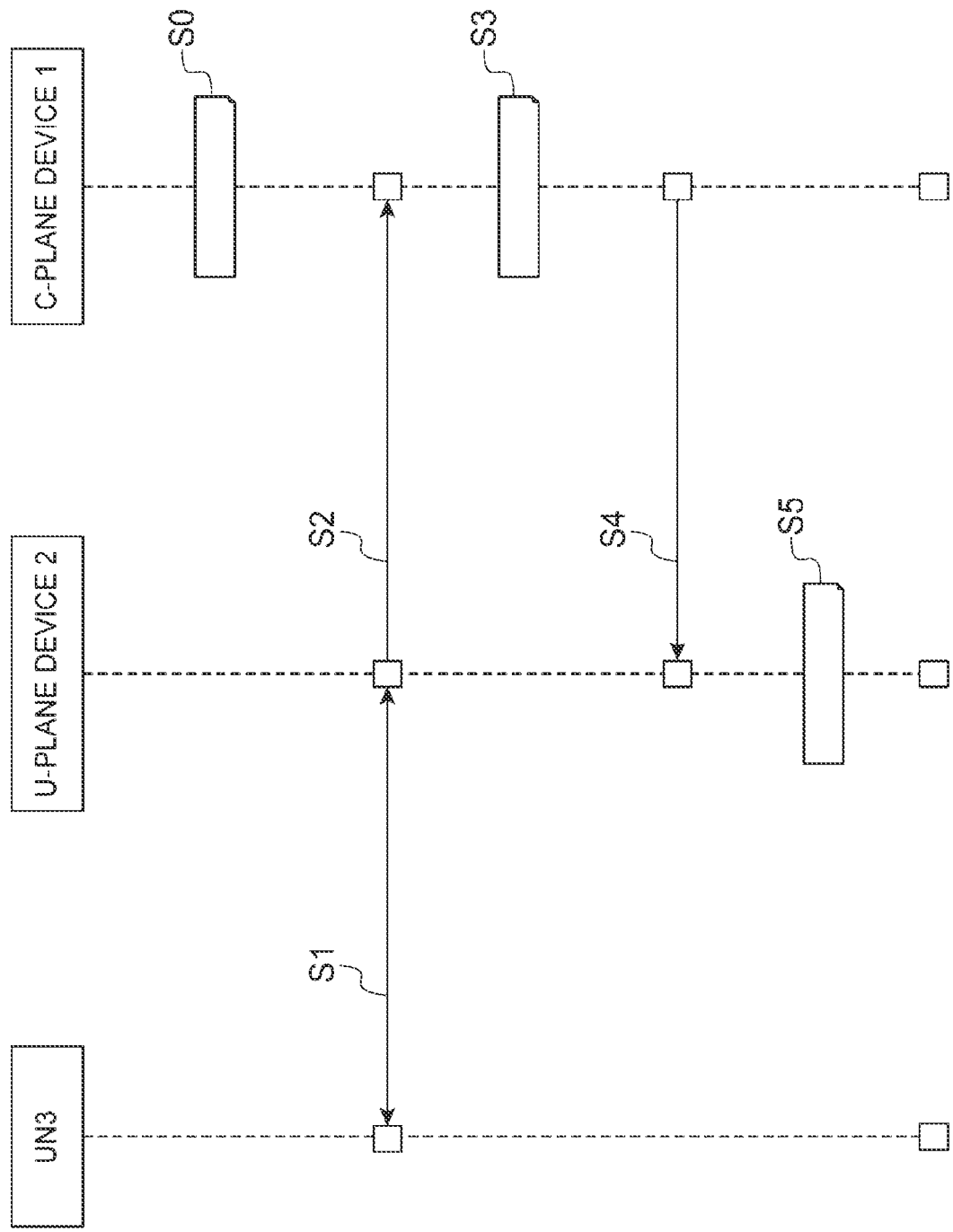
FIG. 6 is a sequence diagram illustrating a path control method in a path control system according to an embodiment of the present invention.

FIG. 6 is a sequence diagram illustrating a path control method in the path control system 4. First, by using the storage unit 10 of the C-plane device 1, the topology information table and the UN specific information table are stored together with a packet search rule table input by a network company or the like (Step S0). Next, by using the UN 3, a connection request or an update request including UN specific information of the UN 3 is transmitted to the U-plane device 2, and a connection process for a connection with the UN 3 is performed using the connection processing unit 21 of the U-plane device 2 (Step S1). Next, by using the connection processing unit 21 of the U-plane device 2, the UN specific information received in S1 is transmitted to the C-plane device 1, the UN specific information is acquired using the acquisition unit 11 of the C-plane device 1, and the UN specific information acquired using the setting unit 12 of the C-plane device 1 is added to the UN specific information table (Step S2).

Next, by using the setting unit 12 of the C-plane device 1, a settings data table is generated on the basis of the packet search rule table and the topology information table stored in S0 and the UN specific information table updated in S2 (Step S3). Next, by using the setting unit 12 of the C-plane device 1, the settings data table generated in S3 is transmitted to (set in) the U-plane device 2 (Step S4). Next, by using the storage unit 20 of the U-plane device 2, the settings data table transmitted in S4 is stored, and, by using the transmission unit 22, a process of transmitting a packet on the basis of the stored settings data table is performed (Step S5).

Figure 7:
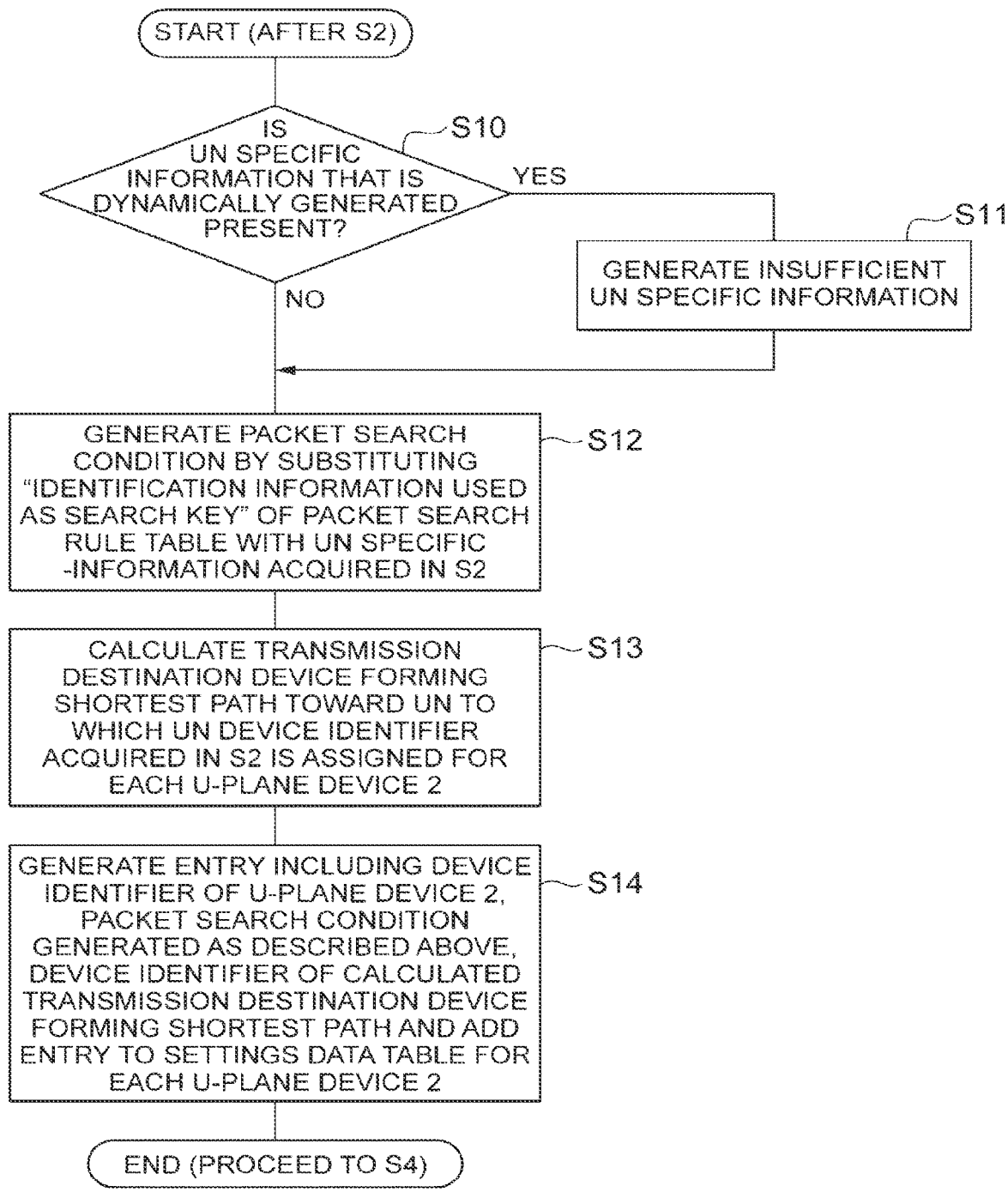
FIG. 7 is a flowchart illustrating a process of S3 illustrated in FIG. 6 in detail.

FIG. 7 is a flowchart illustrating the process of S3 in the sequence diagram illustrated in FIG. 6 in detail. First, after S2 illustrated in FIG. 6, by using the setting unit 12, it is determined whether or not UN specific information that is dynamically generated is present on the basis of the UN specific information acquired in S2 illustrated in FIG. 6 (Step S10). When the presence is determined in S10, by using the setting unit 12, insufficient UN specific information is generated (Step S11). In a case in which no presence is determined in S10, or following S11, by using the setting unit 12, designation information of the packet search rule table is substituted with the UN specific information that is acquired in S2 illustrated in FIG. 6 or the UN specific information that is dynamically generated in S11, and a packet search condition is generated (Step S12).

Next, by using the setting unit 12, for each U-plane device 2, a transmission destination device forming a shortest path toward the UN 3 to which search key information based on the UN specific information of the UN 3 acquired in S2 is assigned is calculated (Step S13). Next, by using the setting unit 12, for each U-plane device 2, a record including the identifier of the U-plane device 2, the packet search condition generated in S12, and the identifier of the transmission destination device forming the shortest path calculated in S13 is generated and is added to the settings data table stored using the storage unit 10 (Step S14). After S14, the process proceeds to S4 illustrated in FIG. 6.

EXAMPLES

Subsequently, example of the path control system 4 will be described. In this example, a setting order of the settings data table will be described using a sequence diagram illustrated in FIG. 9 on the basis of a specific configuration example of the path control system 4 illustrated in FIG. 8, and, a transmission order of each packet illustrated in FIG. 10 will be described using a sequence diagram illustrated in FIGS. 11 and 12 on the basis of a set settings data table.

Figure 8:
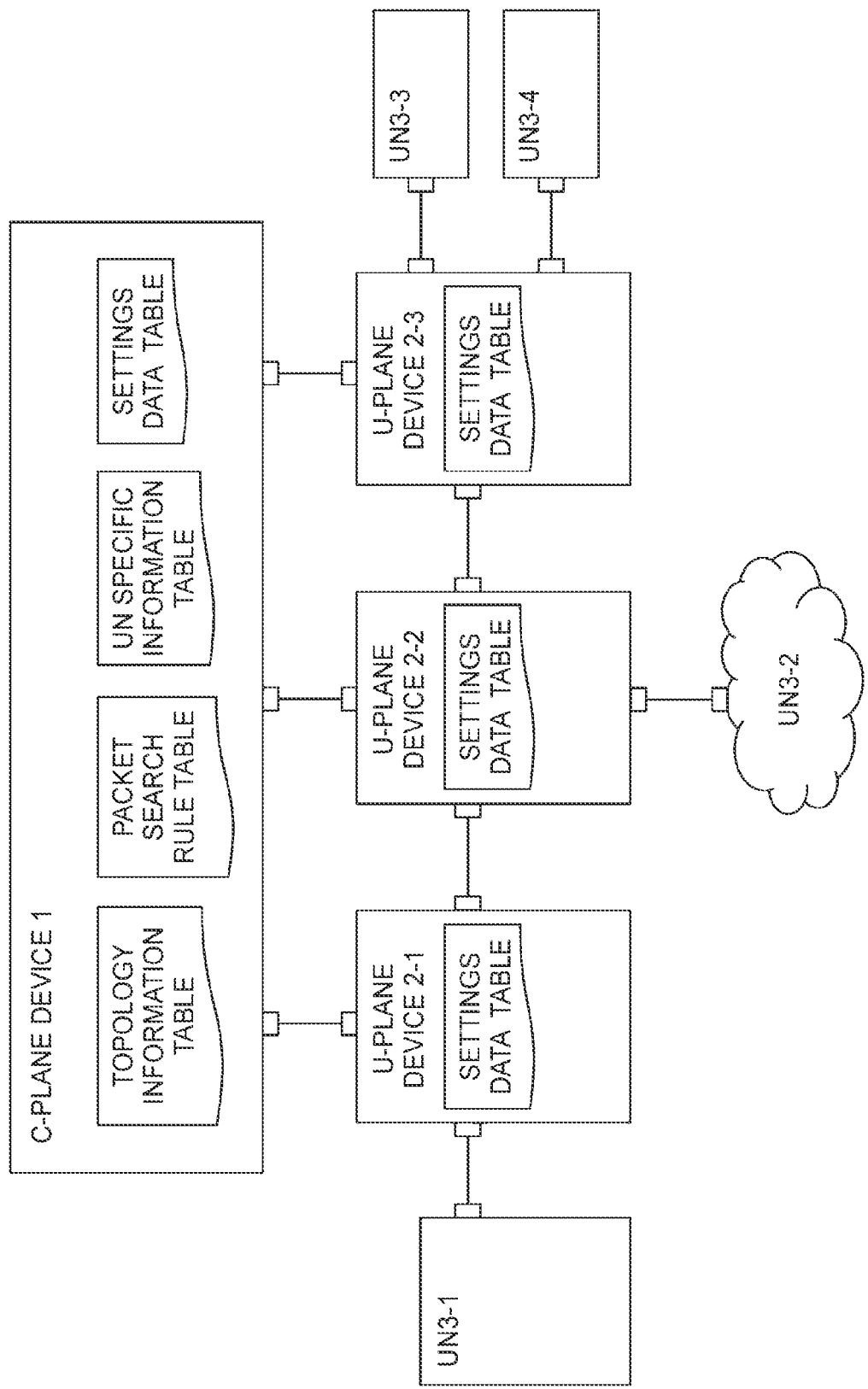
FIG. 8 is a diagram illustrating a specific configuration of a path control system of an example.

FIG. 8 is a diagram illustrating a specific configuration of the path control system 4 of this example. As illustrated in FIG. 8, a UN 3-1 is connected to a U-plane device 2-1 (connected in S25 illustrated in FIG. 9 to be described later), a UN 3-2 is connected to a U-plane device 2-2 (connected in S21 illustrated in FIG. 9 to be described later), a UN 3-3 is connected to a U-plane device 2-3 (connected in S29 illustrated in FIG. 9 to be described later), and a UN 3-4 is connected to a U-plane device 2-3 (connected in S33 illustrated in FIG. 9 to be described later). In addition, the U-plane device 2-1 and the U-plane device 2-2 are connected, and the U-plane device 2-2 and the U-plane device 2-3 are connected. Furthermore, a C-plane device 1 is connected to each of the U-plane device 2-1, the U-plane device 2-2, and the U-plane device 2-3. In addition, the configuration illustrated in FIG. 8 is a configuration based on the example of the topology information table illustrated in FIG. 4(*b*) and the example of the UN specific information table illustrated in FIG. 4(*c*). Furthermore, the C-plane device 1 is configured to include the storage unit 10, the acquisition unit 11, and the setting unit 12 that are the functional blocks described above, and each U-plane device 2 is configured to include the storage unit 20, the connection processing unit 21, and the transmission unit 22 that are the functional blocks described above.

Figure 9:
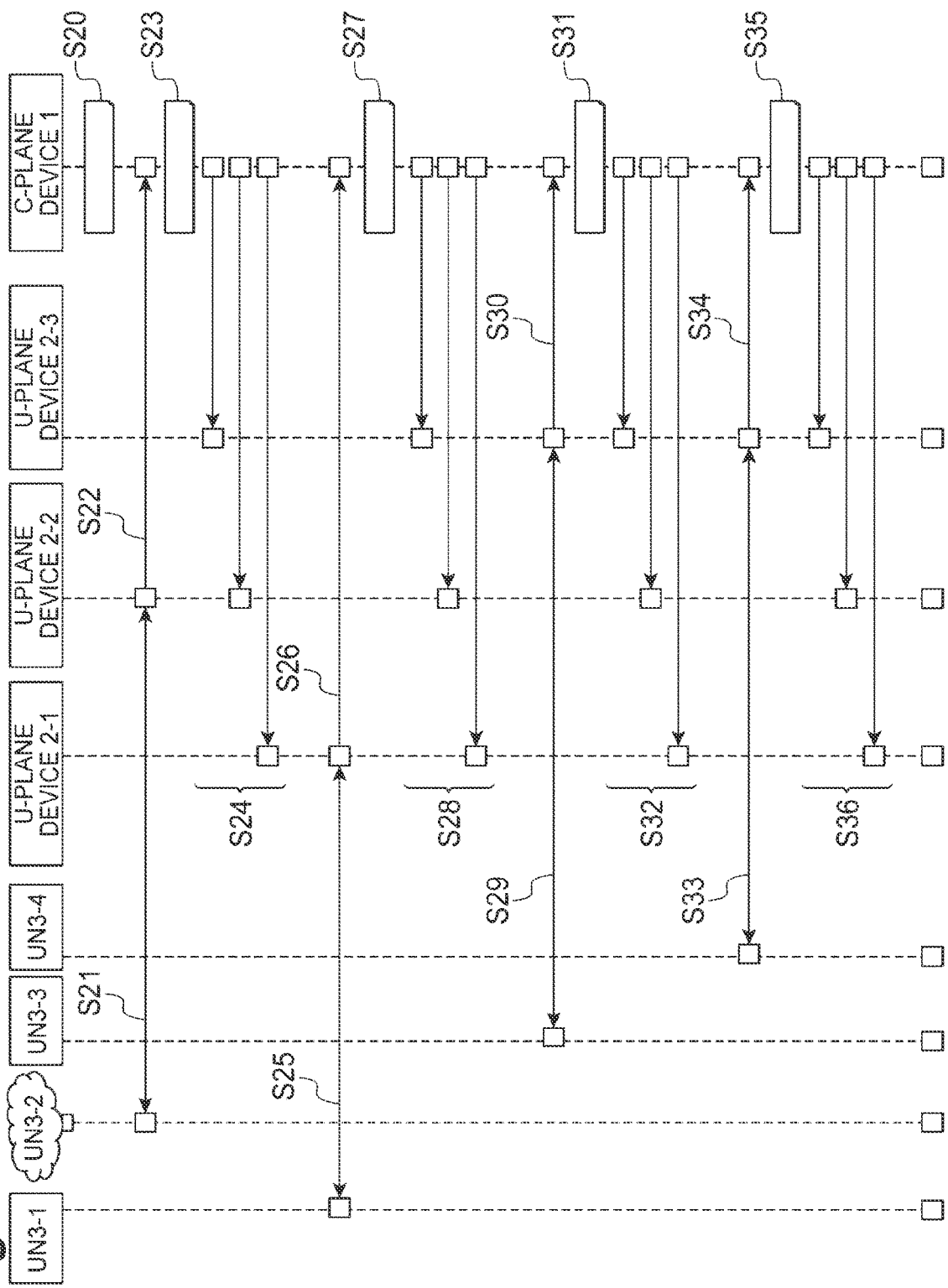
FIG. 9 is a sequence diagram illustrating an order in which a settings data table is set in each relay node in an example.

FIG. 9 is a sequence diagram illustrating an order in which a new UN 3 is connected to the U-plane device 2, and a settings data table based on the connection is set in each U-plane device 2. In FIG. 9, S20 to S24 correspond to details when S0 to S4 illustrated in FIG. 6 are executed at a time when a new UN 3-2 is connected to a U-plane device 2-2, and thus, detailed description thereof will not be presented here. In addition, in S24, a settings data table is transmitted to all the U-plane devices 2 included in the path control system 4 using the C-plane device 1. Similarly, S25 to S28 in FIG. 9 correspond to details when S0 to S4 illustrated in FIG. 6 are executed at a time when a new UN 3-1 is connected to a U-plane device 2-1, S29 to S32 in FIG. 9 correspond to details when S0 to S4 illustrated in FIG. 6 are executed at a time when a new UN 3-3 is connected to a U-plane device 2-3, and S33 to S36 in FIG. 9 correspond to details when S0 to S4 illustrated in FIG. 6 are executed at a time when a new UN 3-4 is connected to a U-plane device 2-3. In addition, a settings data table that is finally set in S36 is assumed to be the table example illustrated in FIG. 5.

FIG. 10 is a diagram illustrating an example of a packet transmitted from a UN 3 that is a transmission source. As illustrated in FIG. 10, a UN 3 identification code of 64 bits is included in the first 64 bits of a packet (hereinafter, referred to as a user packet part), and the remaining part is a payload part. In addition, the UN 3 identification code represents a UN 3 that is the transmission destination. A packet example illustrated in FIG. 10(a) illustrates a packet transmitted in the process (S40 to S44) of "a" of a sequence diagram illustrated in FIG. 11 to be described later. Similarly, a packet example illustrated in FIG. 10(b) illustrates a packet transmitted in the process (S45 to S49) of "b" of the sequence diagram illustrated in FIG. 11, a packet example illustrated in FIG. 10(c) illustrates a packet transmitted in the process (S50 to S54) of "c" of the sequence diagram illustrated in FIG. 11, a packet example illustrated in FIG. 10(d) illustrates a packet transmitted in the process (S55 to S59) of "d" of the sequence diagram illustrated in FIG. 11, and a packet example illustrated in FIG. 10(e) illustrates a packet transmitted in the process (S60 to S64) of "e" of the sequence diagram illustrated in FIG. 11.

Figure 11:
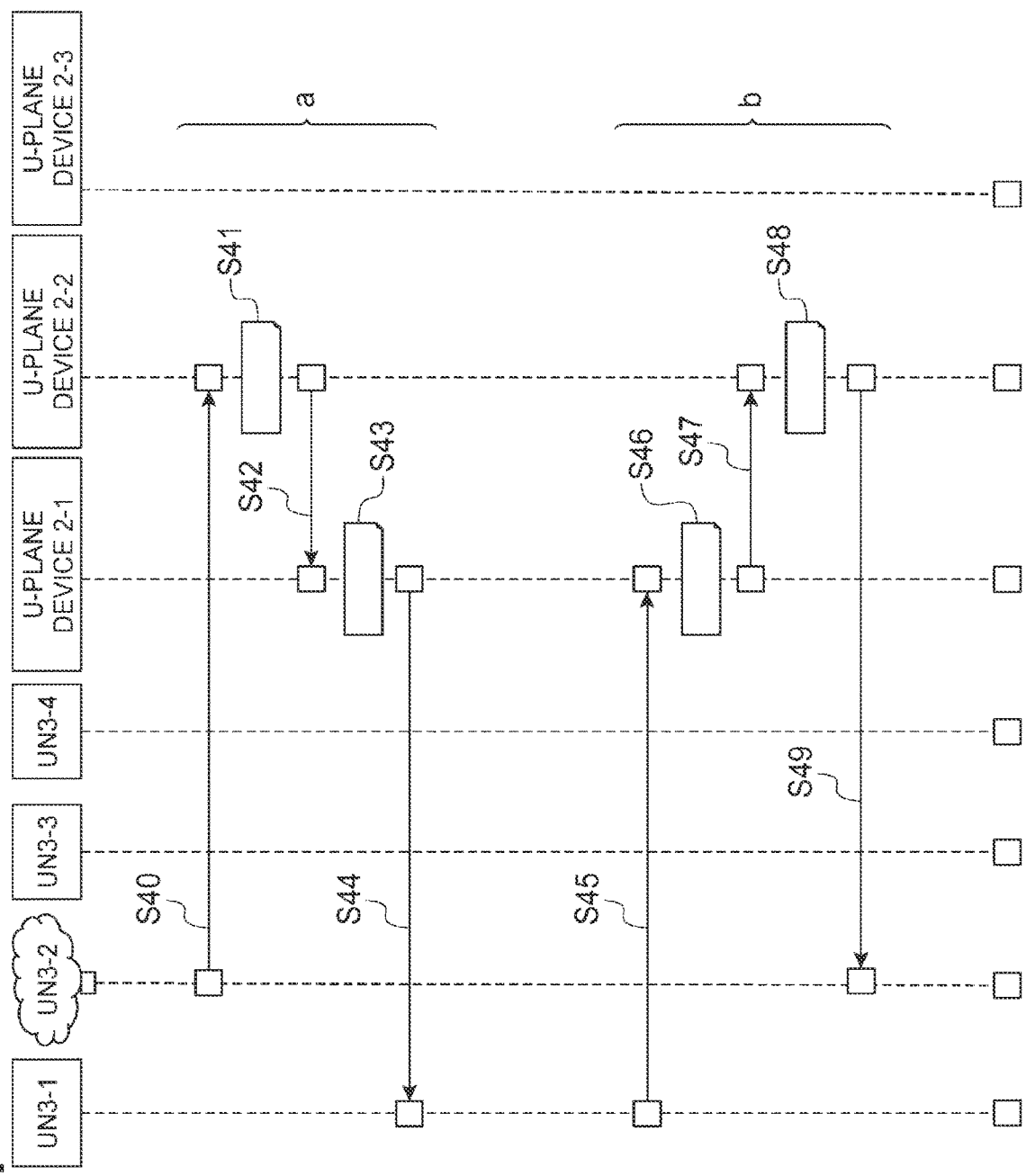
FIG. 11 is a sequence diagram (1) illustrating an order in which a packet is transmitted in a relay node in which a settings data table is set in an example.
Figure 12:
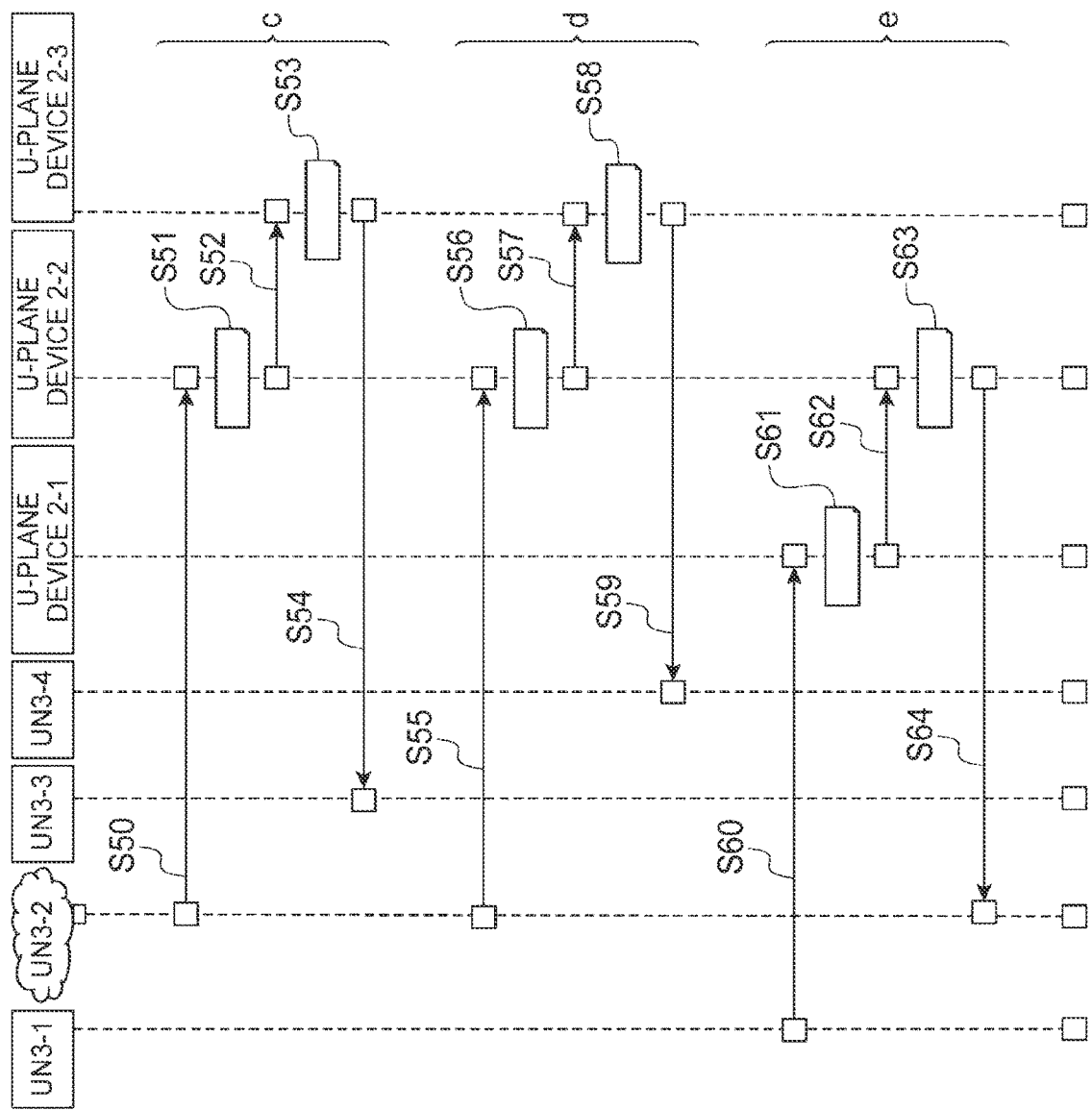
FIG. 12 is a sequence diagram (2) illustrating an order in which a packet is transmitted in a relay node in which a settings data table is set in an example.

Each of FIGS. 11 and 12 is a sequence diagram illustrating an order in which a packet in a U-plane device 2 set in a settings data table is transmitted. First, the process of "a" illustrated in FIG. 11 will be described. First, a packet illustrated in FIG. 10(a) is transmitted from the UN 3-2 to the U-plane device 2-2 directly connected to the UN 3-2 (Step S40). Next, the set settings data table is referred to by the U-plane device 2-2, and it is determined that an 11-th record of the table example illustrated in FIG. 5 satisfies a search condition that the identifier of the U-plane device 2 is "U-plane device 2-2" of its own device, and 64 bits from the start of the user packet part are "0x 0000 0000 0000 0001" like the packet illustrated in FIG. 10(a) as a packet search condition (Step S41). Next, by using the U-plane device 2-2, the packet is transmitted to the U-plane device 2-1 represented by the identifier of the transmission destination device of the 11-th record (Step S42).

Next, the set settings data table is referred to by the U-plane device 2-1, and it is determined that a first record of the table example illustrated in FIG. 5 satisfies a search condition that the identifier of the U-plane device 2 is "U-plane device 2-1" of its own device, and 64 bits from the start of the user packet part are "0x 0000 0000 0000 0001" like the packet illustrated in FIG. 10(a) as a packet search condition (Step S43). Next, by using the U-plane device 2-1, the packet is transmitted to the UN 3-1 represented by the identifier of the transmission destination device of the first record (Step S44).

The process of "b" illustrated in FIG. 11 and the process of "c" to "e" illustrated in FIG. 12 are similar to that described above, and thus, description thereof will not be presented here. In addition, a 2nd record satisfies the search condition in S46, a 12-th record satisfies the search condition in S48, a 13-th record satisfies the search condition in S51, an 8-th record satisfies the search condition in S53, a 14-th record satisfies the search condition in S56, a 9-th record satisfies the search condition in S58, a 5-th record satisfies the search condition in S61, and a 15-th record satisfies the search condition in S63.

Modified Example 1

Subsequently, Modified example 1 of the example of the path control system 4 described above will be described. In this Modified example 1, packet communication is performed through one virtual network among a plurality of virtual networks established on a path, which is mainly different from the example described above. In this Modified example 1, on the basis of a specific configuration example of a path control system 4v illustrated in FIG. 13, a packet search rule table, a topology information table, and a UN specific information table illustrated in FIG. 14 stored by a C-plane device 1v, and a settings data table illustrated in FIG. 15 stored by the C-plane device 1v and a U-plane device 2v, a setting order of a settings data table will be described using a sequence diagram illustrated in FIGS. 16 to 18, and, on the basis of a set settings data table, a transmission order of each packet illustrated in FIG. 19 will be described using a sequence diagram illustrated in FIGS. 20 and 21. In addition, "v" will be appropriately attached to a corresponding reference sign of the example described above as a reference sign of each of devices and functional blocks of this Modified example 1. The configuration and the functions of this Modified example 1 are almost the same as those of the example described above, and thus, similar parts will not be described as is appropriate, and differences will be mainly described.

Figure 13:
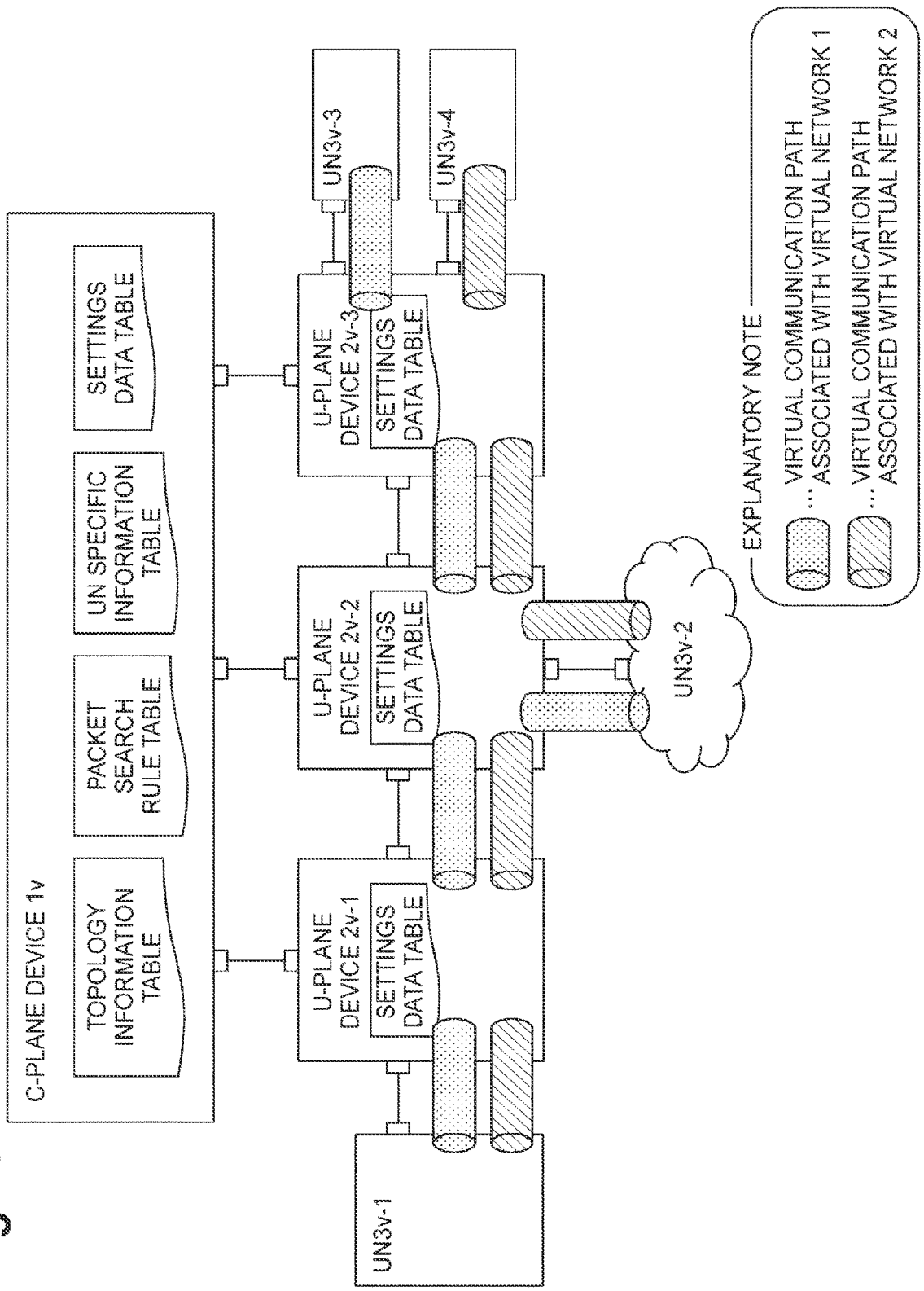
FIG. 13 is a diagram illustrating a specific configuration of a path control system according to Modified example 1.

FIG. 13 is a diagram illustrating a specific configuration of a path control system 4v of this Modified example 1. As illustrated in FIG. 14, in this Modified example 1, compared to the example described above, one or more virtual communication paths are established between a UN 3v and a U-plane device 2v and between U-plane devices 2v. More specifically, two virtual communication paths including a virtual communication path associated with a virtual network 1 and a virtual communication path associated with a virtual network 2 are established between a UN 3v-1 and a U-plane device 2v-1, between a UN 3v-2 and a U-plane device 2v-2, between a U-plane device 2v-1 and a U-plane device 2v-2, and between a U-plane device 2v-2 and a U-plane device 2v-3. In addition, one virtual communication path associated with the virtual network 1 is established between a UN 3v-3 and a U-plane device 2v-3, and one virtual communication path associated with the virtual network 2 is established between a UN 3v-4 and a U-plane device 2v-3. Packet communication from the UN 3v that is a transmission source to the UN 3v that is a transmission destination is performed through one of the virtual communication path associated with the virtual network 1 and the virtual communication path associated with the virtual network 2. A configuration illustrated in FIG. 13 is a configuration based on an example of the topology information table illustrated in FIG. 14(b) and an example of the UN specific information table illustrated in FIG. 14(c). In addition, the virtual communication path is a communication connecting device and represents a communication path generated in association with a virtual network.

FIG. 14 is a diagram illustrating examples of a packet search rule table, a topology information table, and a UN specific information table, which are stored using a storage unit 10v, in Modified example 1. Hereinafter, differences from the table examples of the example described above illustrated in FIG. 4 will be described. FIG. 14(a) is a diagram illustrating an example of the packet search rule table. As illustrated in FIG. 14(a), in the packet search rule table, part information and designation information are associated with each other for each virtual network. In other words, a network company can set a search condition for each virtual network. FIG. 14(b) is a diagram illustrating an example of a topology information table. As illustrated in FIG. 14(b), a connection relation between devices is set for each virtual network. FIG. 14(c) is a diagram illustrating an example of a UN specific information table. As illustrated in the table example illustrated in FIG. 14(c), for each UN 3v, a UN 3v identification code for each virtual network is (acquired by an acquisition unit 11v and set by a setting unit 12v) is set.

FIG. 15 is a diagram illustrating an example of a settings data table set by the setting unit 12v in Modified example 1. Hereinafter, differences from the table example of the example described above illustrated in FIG. 5 will be described. As illustrated in FIG. 15, an identifier of a U-plane device 2v, a packet search condition, and an identifier of a transmission destination device are associated with each other for each virtual network.

When a new UN 3v is connected to a U-plane device 2v, the setting unit 12v acquires node information relating to the UN 3v, extracts search key information of the UN 3v for each virtual network on the basis of the acquired node information and designation information of each virtual network stored using the storage unit 10v, and sets a transmission destination of the packet of a case in which the extracted search key information of the virtual network is included in a packet part indicated by the part information of each virtual network stored using the storage unit 10v of a packet received by the U-plane device 2v at the time of relaying the packet for each virtual network and each U-plane device 2v. Hereinafter, description will be presented more specifically with reference to FIGS. 16 to 21.

Figure 16:
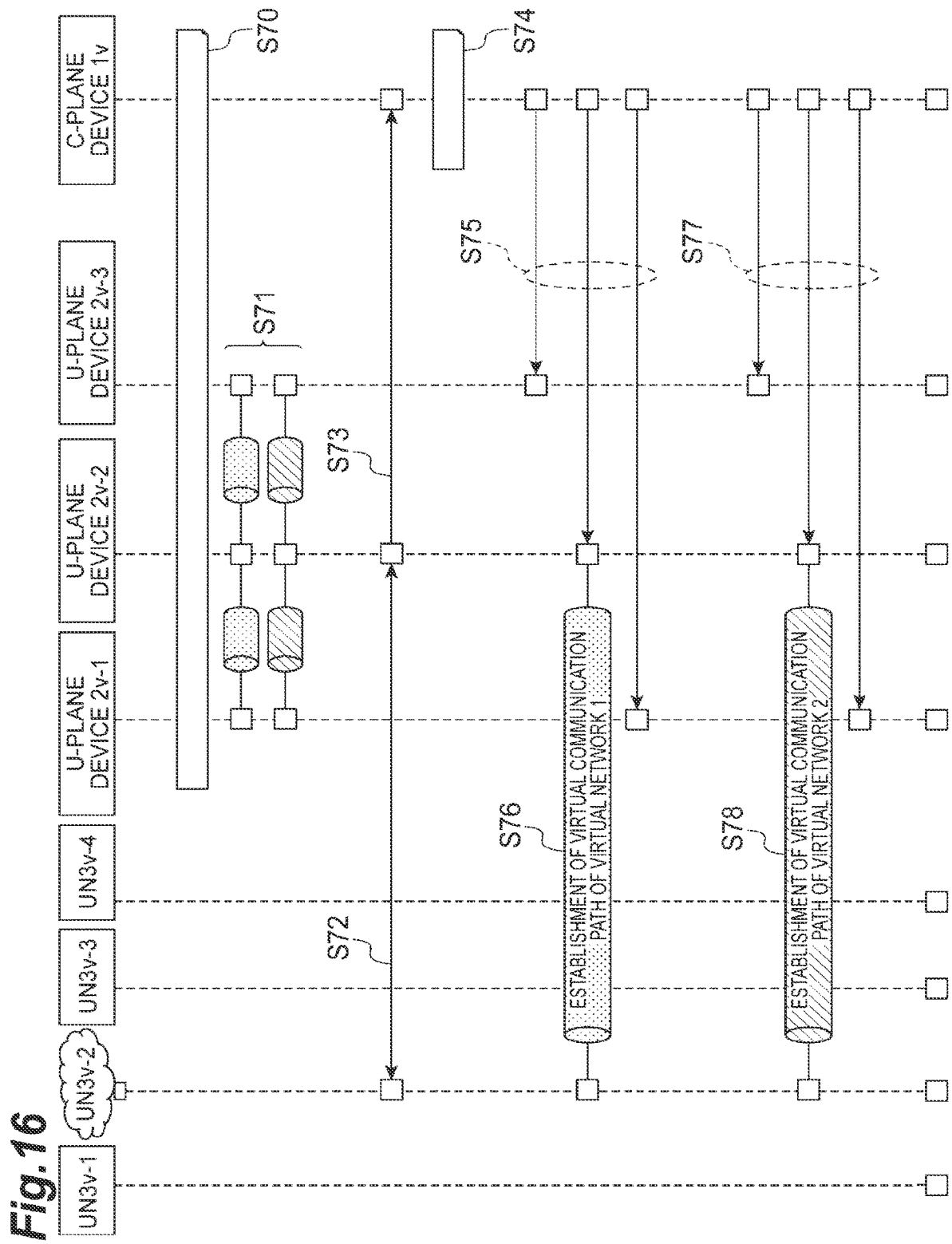
FIG. 16 is a sequence diagram (1) illustrating an order in which a settings data table is set in each relay node in Modified example 1.
Figure 17:
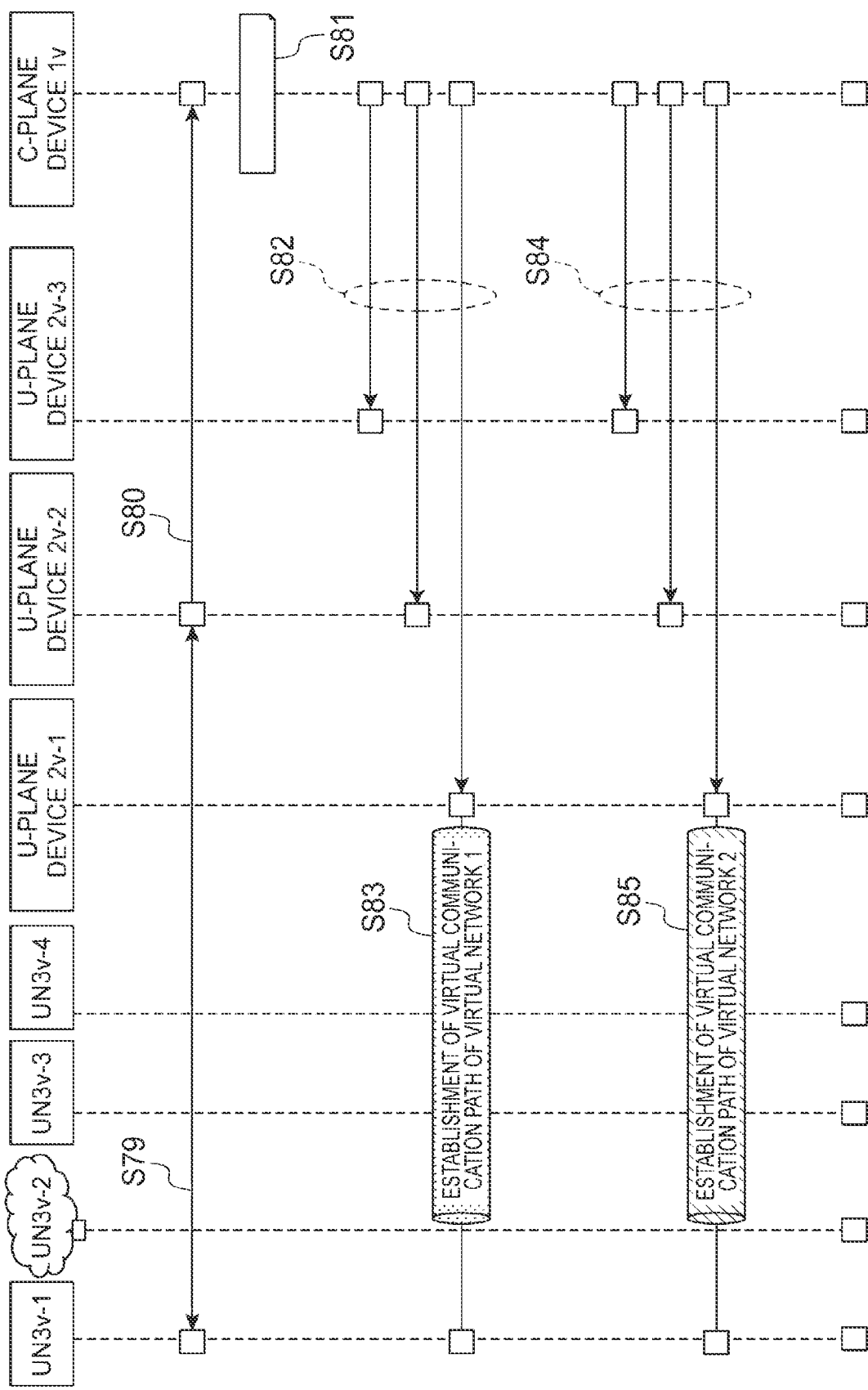
FIG. 17 is a sequence diagram (2) illustrating an order in which a settings data table is set in each relay node in Modified example 1.
Figure 18:
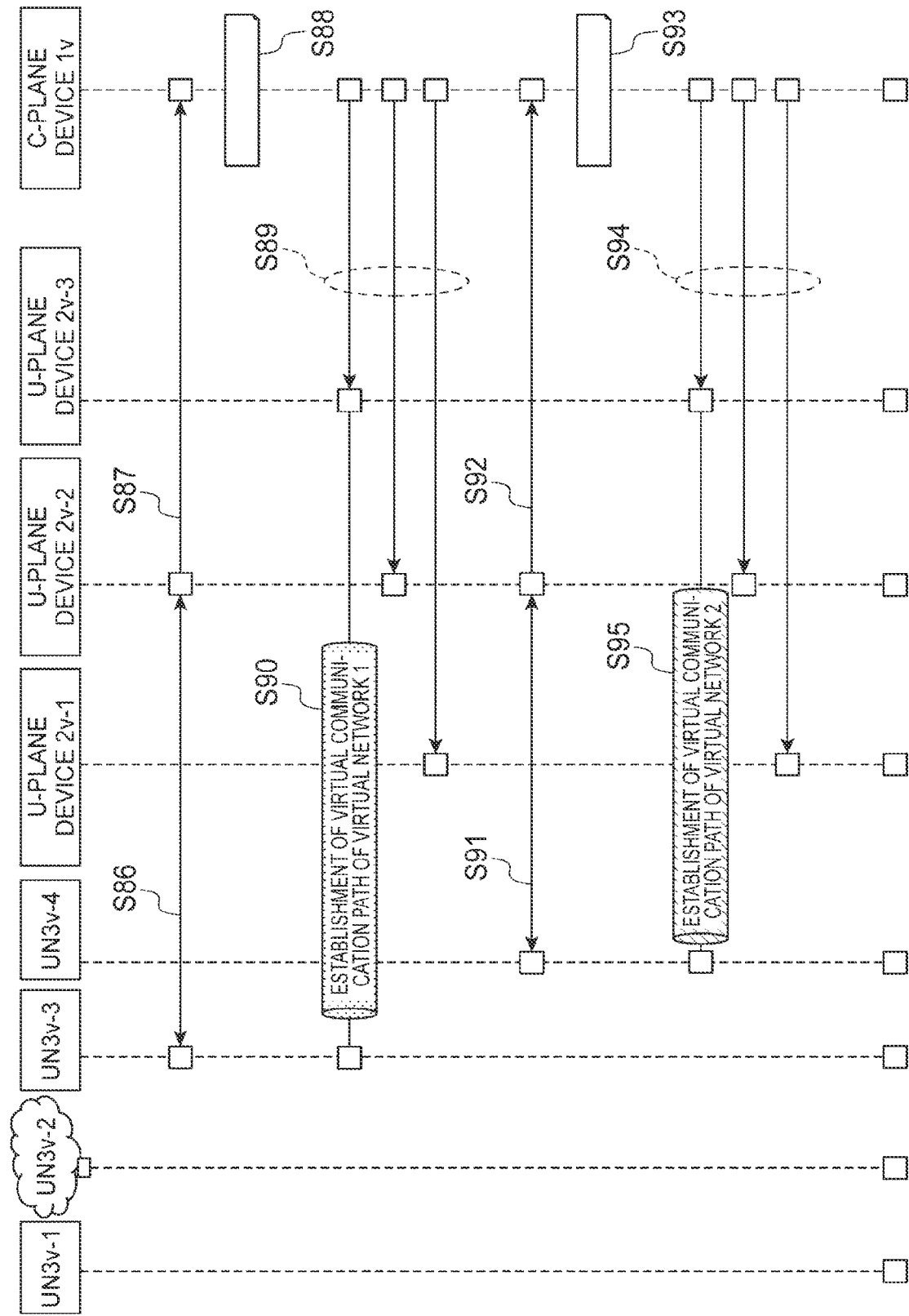
FIG. 18 is a sequence diagram (3) illustrating an order in which a settings data table is set in each relay node in Modified example 1.

FIGS. 16 to 18 are sequence diagrams illustrating an order in which a new UN 3v is connected to a U-plane device 2v, and a settings data table based on the connection is set in each U-plane device 2v. S70 in FIG. 16 corresponds to S20 of the example described above illustrated in FIG. 9, and S72 to S74 in FIG. 16 respectively correspond to S21 to S23 illustrated in FIG. 9, and thus detailed description thereof will not be presented here. In S71, virtual communication paths associated with the virtual network 1 and the virtual network 2 are established between U-plane devices 2v on the basis of the example of the topology information table illustrated in FIG. 14(b) stored in S70. Each of S75 and S77 illustrated in FIG. 16 corresponds to S24 illustrated in FIG. 9 and represents that a settings data table is set in (transmitted to) a U-plane device 2v represented by the identifier of a corresponding U-plane device 2v for each identifier of the virtual network of the example of the settings data table illustrated in FIG. 15. In addition, when a settings data table associated with the virtual network 1 is received in S75, the U-plane device 2v-2 that has received a connection request in S72 establishes a virtual communication path associated with the virtual network 1 for communicating with the UN 3v-2, which has performed the connection process in S72, in S76. Similarly, when a settings data table associated with the virtual network 2 is received in S77, the U-plane device 2v-2 that has received the connection request in S72 establishes a virtual communication path associated with the virtual network 2 for communicating with the UN 3v-2, which has performed the connection process in S72, in S78.

S79 to S85 of the sequence diagram illustrated in FIG. 17 respectively correspond to S72 to S78 of the sequence diagram illustrated in FIG. 16. The sequence diagram illustrated in FIG. 16 is a setting example of a settings data table based on a connection request from the UN 3v-2, and the sequence diagram illustrated in FIG. 17 is a setting example of a settings data table based on a connection request from the UN 3v-1.

S86 to S90 of the sequence diagram illustrated in FIG. 18 respectively correspond to S72 to S76 of the sequence diagram illustrated in FIG. 16. The sequence diagram illustrated in FIG. 16 is a setting example of a settings data table associated with the virtual network 1 based on a connection request from the UN 3v-2, and the sequence diagram illustrated in FIG. 18 is a setting example of a settings data table associated with the virtual network 1 based on a connection request from the UN 3v-3. Only being a settings data table associated with the virtual network 1 is in accordance with only the virtual network 1 being associated with the UN 3v-3 as an identifier of the virtual network in the UN specific information table illustrated in FIG. 14(c). In other words, this represents that only the UN 3v identification code relating to the virtual network 1 is extracted by the setting unit 12v from the node information acquired by the acquisition unit 11v.

S91 to S95 of the sequence diagram illustrated in FIG. 18 respectively correspond to S72 to S74, S77, and S78 of the sequence diagram illustrated in FIG. 16. The sequence diagram illustrated in FIG. 16 is a setting example of a settings data table associated with the virtual network 2 based on a connection request from the UN 3v-2, and the sequence diagram illustrated in FIG. 18 is a setting example of a settings data table associated with the virtual network 2 based on a connection request from the UN 3v-4. Only being a settings data table associated with the virtual network 2 is in accordance with only the virtual network 2 being associated with the UN 3v-4 as an identifier of the virtual network in the UN specific information table illustrated in FIG. 14(c). In other words, this represents that only the UN 3v identification code relating to the virtual network 2 is extracted by the setting unit 12v from the node information acquired by the acquisition unit 11v.

FIG. 19 is a diagram illustrating an example of a packet transmitted from the UN 3v that is a transmission source. As illustrated in FIG. 19, a virtual communication path header designating a virtual communication path is present at the start of a packet, and subsequently, a user packet part is present. The virtual communication path header of a packet illustrated in each of FIGS. 19(a) and 19(c) illustrates a virtual communication path associated with the virtual network 1, and the virtual communication path header of a packet illustrated in each of FIGS. 19(b) and 19(d) illustrates a virtual communication path associated with the virtual network 2. In a user packet part of a packet illustrated in each of FIGS. 19(a) and 19(c) relating to the virtual communication path associated with the virtual network 1, a UN 3v identification code of 64 bits is included in the first 64 bits, and the remaining part is a payload part. On the other hand, in a user packet part of a packet illustrated in each of FIGS. 19(b) and 19(d) relating to the virtual communication path associated with the virtual network 2, a UN 3v identification code of 32 bits is included from the first 128-th bit, and subsequently, the other header parts and a payload part follow.

An example of a packet illustrated in FIG. 19(a) illustrates a packet transmitted in the process (S100 to S104) of "a" of the sequence diagram illustrated in FIG. 20 to be described later. Similarly, an example of a packet illustrated in FIG. 19(b) illustrates a packet transmitted in the process (S105 to S109) of "b" of the sequence diagram illustrated in FIG. 20, an example of a packet illustrated in FIG. 19(c) illustrates a packet transmitted in the process (S110 to S114) of "c" of the sequence diagram illustrated in FIG. 21, and an example of a packet illustrated in FIG. 19(d) illustrates a packet transmitted in the process (S115 to S119) of "d" of the sequence diagram illustrated in FIG. 21.

Figure 20:
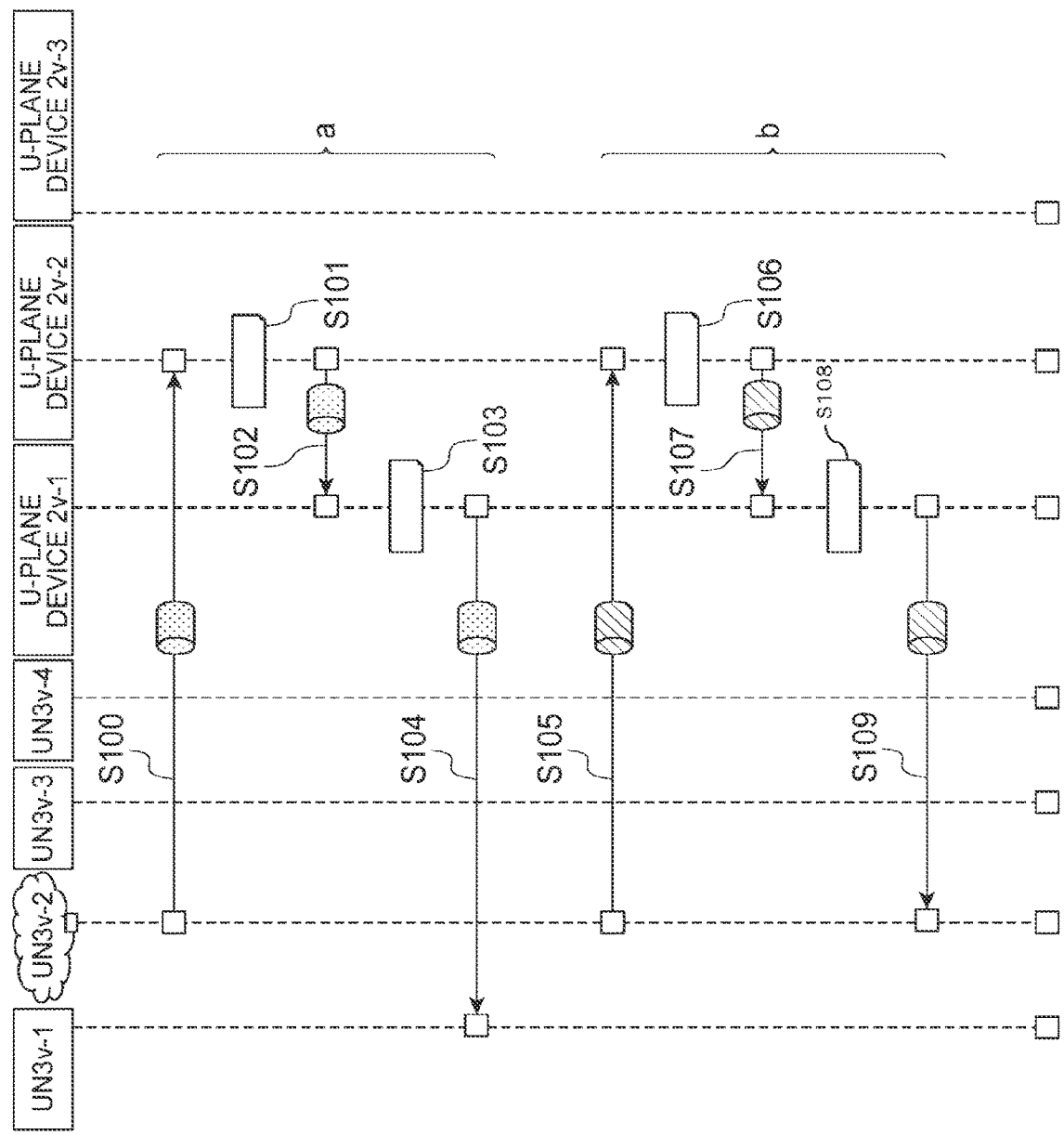
FIG. 20 is a sequence diagram (1) illustrating an order in which a packet is transmitted in a relay node in which a settings data table is set in Modified example 1.
Figure 21:
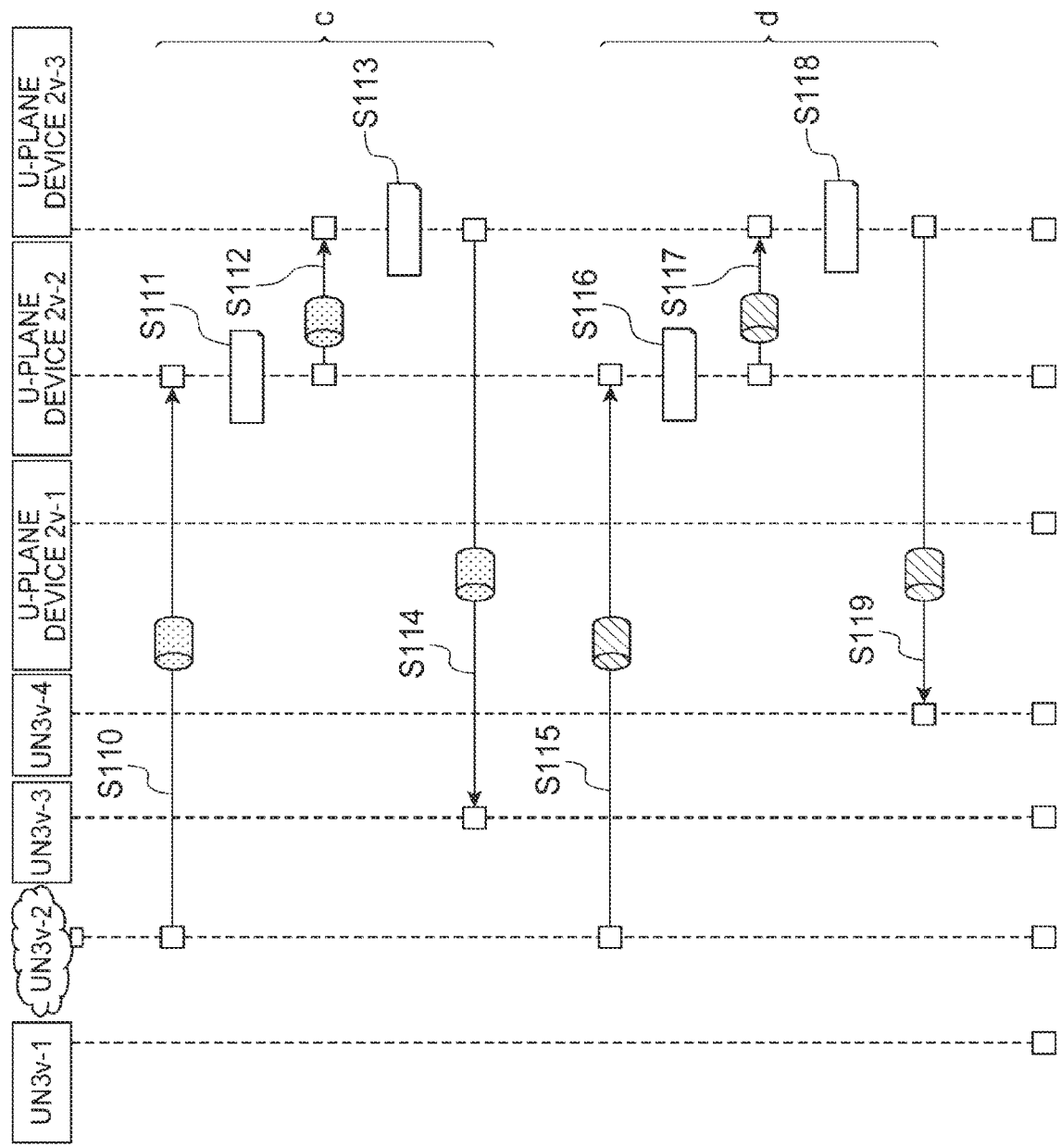
FIG. 21 is a sequence diagram (2) illustrating an order in which a packet is transmitted in a relay node in which a settings data table is set in Modified example 1.

Each of FIGS. 20 and 21 is a sequence diagram illustrating an order in which a packet is transmitted in U-plane devices 2v in which a settings data table is set. First, the process of "a" illustrated in FIG. 20 will be described. First, the packet illustrated in FIG. 19(a) is transmitted from a UN 3v-2 to a U-plane device 2v-2, which is directly connected to the UN 3v-2, through a virtual communication path associated with the virtual network 1 (Step S100). Next, the virtual network 1 is determined as a virtual network to which the packet transmitted by the U-plane device 2v-2 belongs, a settings data table corresponding to the determined virtual network 1 is referred to (in other words, records of the virtual network 1 determined as the virtual network identifier are referred to), and it is determined that a seventh record of the table example illustrated in FIG. 15 satisfies a search condition that the identifier of the U-plane device 2v is "U-plane device 2v-2" of its own device, and 64 bits from the start of the user packet part are "0x 0000 0000 0000 0001" like the packet illustrated in FIG. 19(a) as a packet search condition (Step S101). Next, a packet is transmitted to a U-plane device 2v-1 represented by the identifier of the transmission destination device of the seventh record using the U-plane device 2v-2 (Step S102).

Next, the virtual network 1 is determined as a virtual network to which the packet transmitted by the U-plane device 2v-1 belongs, a settings data table corresponding to the determined virtual network 1 is referred to (in other words, records of the virtual network 1 determined as the virtual network identifier are referred to), and it is determined that a first record of the table example illustrated in FIG. 15 satisfies a search condition that the identifier of the U-plane device 2v is "U-plane device 2v-1" of its own device, and 64 bits from the start of the user packet part are "0x 0000 0000 0000 0001" like the packet illustrated in FIG. 19(a) as a packet search condition (Step S103). Next, a packet is transmitted to a UN 3v-1 represented by the identifier of the transmission destination device of the first record using the U-plane device 2v-1 (Step S104).

The process of "b" illustrated in FIG. 20 and the processes of "c" and "d" illustrated in FIG. 21 are similar thereto, and description thereof will not be presented here.

Modified Example 2

Subsequently, Modified example 2 of the example of the path control system 4 described above will be described. In this Modified example 2, a U-plane device 2 (rendezvous node) that is a default transmission destination of a case in which a packet search condition does not match is designated using an access point name (a so-called an access point name (APN)), which is the mainly difference from the example described above. The rendezvous node, for example, is a packet data network gateway (PDN-GW) in an EPS.

Figure 22:
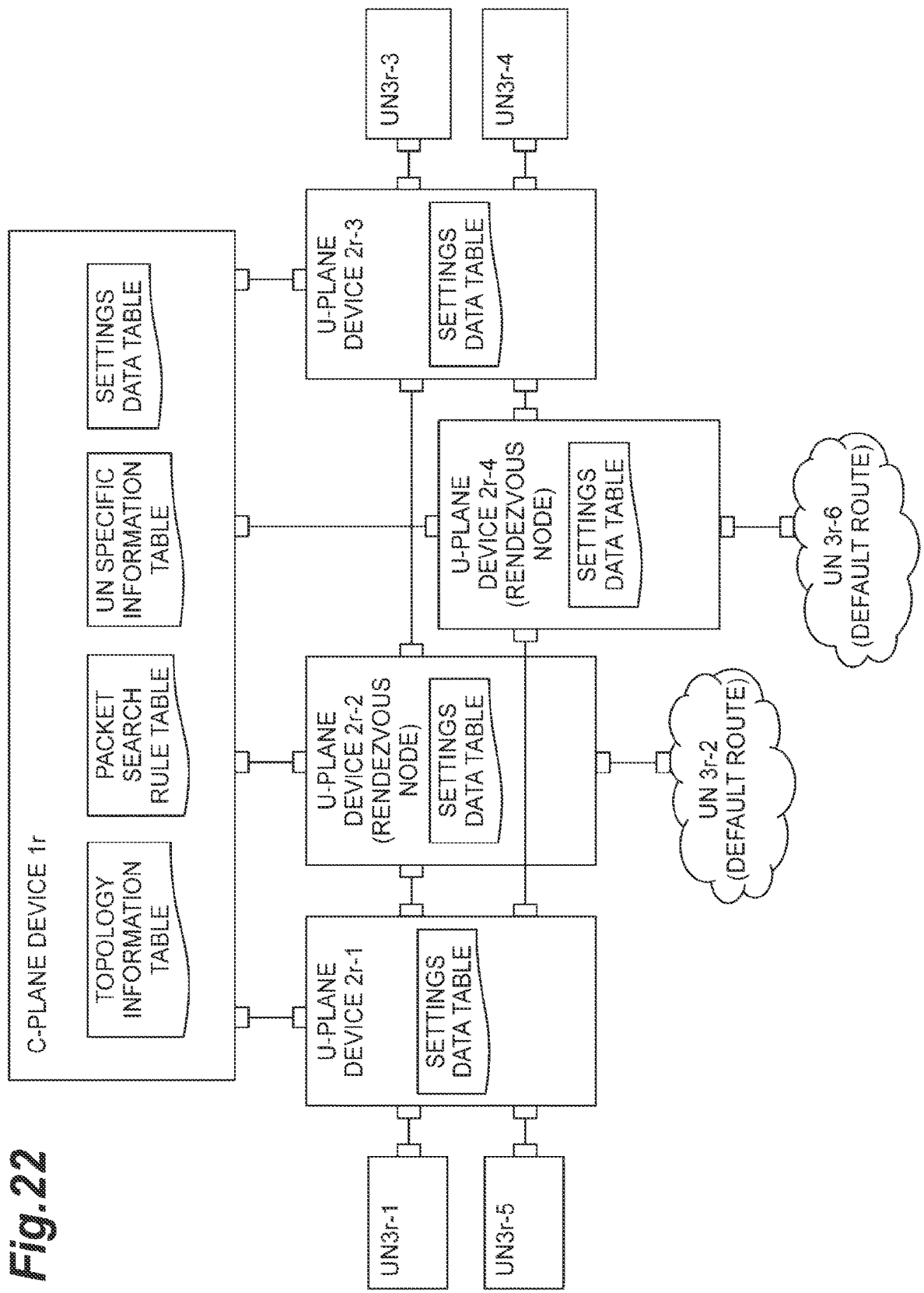
FIG. 22 is a diagram illustrating a specific configuration of a path control system of Modified example 2.
Figure 24:
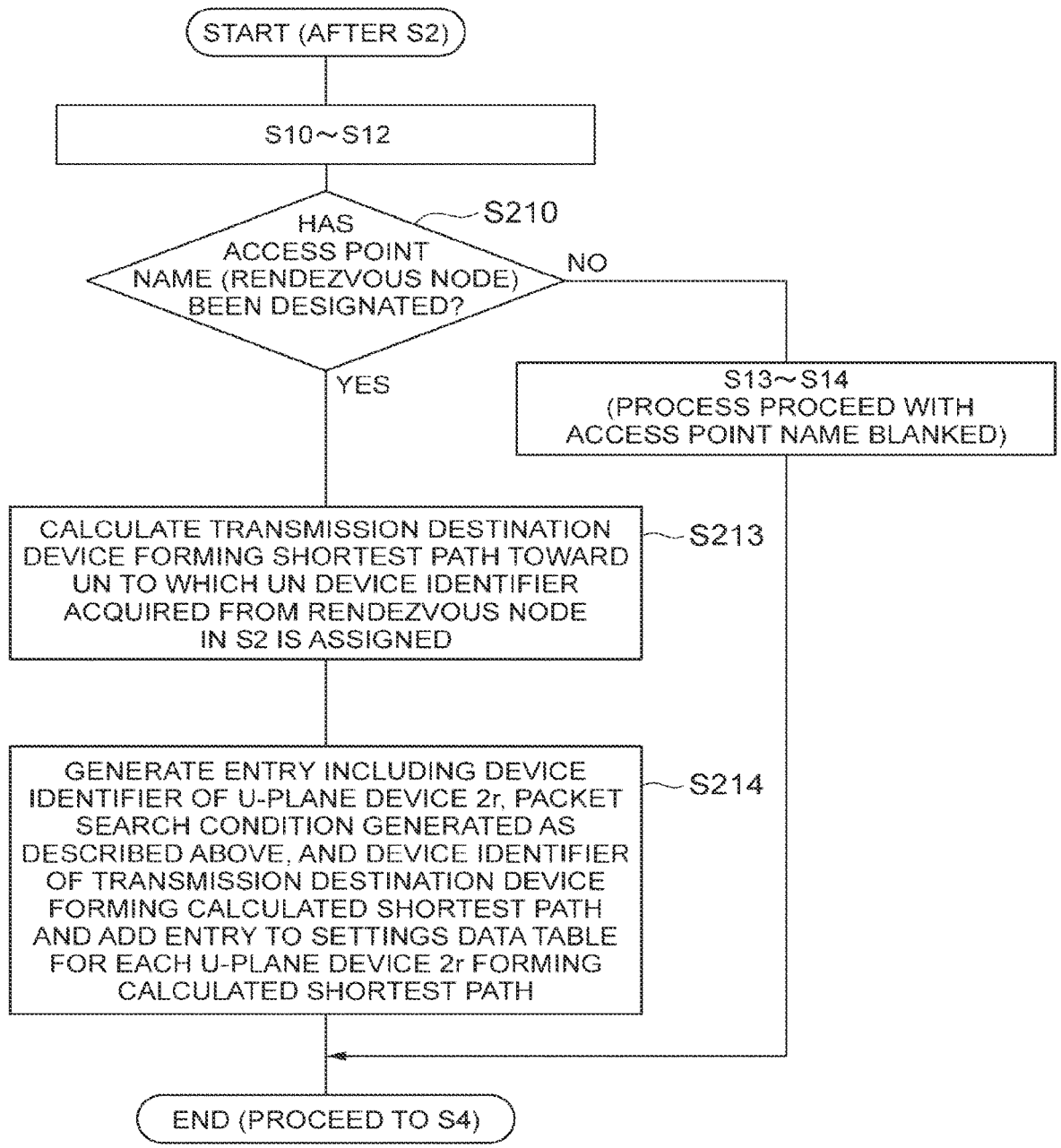
FIG. 24 is a flowchart illustrating the process of S3 illustrated in FIG. 6 in detail in Modified example 2.

In this Modified example 2, a specific configuration example of a path control system 4r is illustrated in FIG. 22, a packet search rule table, a topology information table, and a UN specific information table stored by a C-plane device 1r are illustrated in FIG. 23, a flowchart illustrating this Modified example 2 of the process of S3 of the sequence diagram illustrated in FIG. 6 (the process relating to the generation of a settings data table) in detail is illustrated in FIG. 24, and settings data tables stored by the C-plane device 1r and a U-plane device 2r are illustrated in FIGS. 25 and 26. In addition, "r" will be appropriately attached to a corresponding reference sign of the example described above as a reference sign of each of devices and functional blocks of this Modified example 2. The configuration and the functions of this Modified example 2 are almost the same as those of the example described above, and thus, similar parts will not be described as is appropriate, and differences will be mainly described.

FIG. 22 is a diagram illustrating a specific configuration of a path control system 4r of this Modified example 2. As illustrated in FIG. 22, in this Modified example 2, compared to the example described above, a U-plane device 2r-2 is designated as a rendezvous node. A UN 3r-2 that is a default route representing a node to which a packet is transmitted in a case in which a search condition does not match is connected to the U-plane device 2r-2. In addition, a new U-plane device 2r-4 is connected to a C-plane device 1r, a U-plane device 2r-1, and a U-plane device 2r-3. A U-plane device 2r-4 is designated as a rendezvous node, and a UN 3r-6 that is a default route is connected thereto. In addition, a new UN 3r-5 is connected to the U-plane device 2r-1. In addition, a configuration illustrated in FIG. 22 is a configuration based on an example of the topology information table illustrated in FIG. 23(b) and an example of the UN specific information table illustrated in FIG. 23(c).

FIG. 23 is a diagram illustrating examples of a packet search rule table, a topology information table, and a UN specific information table in Modified example 2 that are stored using a storage unit 10r. Hereinafter, differences from the table examples in the example described above illustrated in FIG. 4 will be described. FIG. 23(a) is a diagram illustrating an example of the packet search rule table. As illustrated in FIG. 23(a), in the packet search rule table, part information and designation information are associated with each other for each access point name and each designation information type. Here, the designation information type is a type of designation information at an access point represented by a corresponding access point name. Specific examples of the designation information type include a type of a network protocol and a PDN type in an EPS. In this way, by assigning a designation information type in accordance with an access point name, even in the case of connecting to a same access point, an appropriate type can be selected from among a plurality of types of designation information. A network company can set a search condition for each access point name and each designation information type. FIG. 23(c) is a diagram illustrating an example of the UN specific information table. As in the table example illustrated in FIG. 23(c), in each UN 3r, a UN 3r identification code for each access point name and each designation information type is (acquired by the acquisition unit 11r) set (by the setting unit 12r).

FIG. 24 is a flowchart illustrating the process of S3 of the sequence diagram illustrated in FIG. 6 in this Modified example 2 in detail. First, after S2 illustrated in FIG. 6, S10 to S12 illustrated in FIG. 7 are performed. After S12, by using the setting unit 12r, it is determined whether or not an access point name (rendezvous node) is designated in the node information acquired in S2 illustrated in FIG. 6 (Step S210). In a case in which it is determined that an access point name is not designated in S210, the process of S13 and S14 illustrated in FIG. 7 is performed (in other words, the process proceeds with the access point name blanked), and the process proceeds to the process of S4 illustrated in FIG. 6. On the other hand, in a case in which it is determined that an access point name is designated in S210, by using the setting unit 12r, a transmission destination device forming a shortest path from the rendezvous node toward a UN 3r to which the UN device identifier acquired in S2 is assigned is calculated (Step S213). Next, by using the setting unit 12r, for each U-plane device 2r forming a shortest path calculated in S213, an entry including a device identifier of the U-plane device 2r, the generated packet search condition, and a device identifier of the calculated transmission destination device forming the shortest path is generated and is added to the settings data table (Step S214). After S214, the process proceeds to S4 illustrated in FIG. 6.

Each of FIGS. 25 and 26 is a diagram illustrating an example of a settings data table set using the setting unit 12r in this Modified example 2. Hereinafter, differences from the table example in the example illustrated in FIG. 5 described above will be described. As illustrated in FIGS. 25 and 26, for each access point name and each designation information type, an identifier of the U-plane device 2r, a packet search condition, and an identifier of the transmission destination device are associated with each other.

The example of the settings data table illustrated in FIG. 25 is a table example of an initial state stored using the storage unit 10r in S0 illustrated in FIG. 6. As illustrated in the table example of FIG. 25, in the initial state, U-plane devices 2r other than the rendezvous node are set to transmit a packet toward the rendezvous node in a case in which the search condition does not match. In addition, the U-plane device 2r of the rendezvous node in which a default route is set is set to transmit a packet to the default route node in a case in which the search condition does not match. In addition, the U-plane device 2r of the rendezvous node in which a default route is not set may discard the packet in a case in which the search condition does not match (alternatively, a device identifier representing "discard" may be set in the transmission destination device identifier).

Next, the operations and effects of the C-plane device 1 and the U-plane device 2 configured as in this embodiment will be described.

The C-plane device 1 according to this embodiment is a C-plane device 1 in a path control system 4 comprising one or more U-plane devices 2 relaying packet communication between UNs 3 and the C-plane device 1 performing path control of the packet communication and comprises a storage unit 10 that stores designation information designating search key information of a UN 3 used as a search key of transmission destination determination when the U-plane device 2 relays a packet and part information indicating a packet part in which the search key information is included and an acquisition unit 11 and a setting unit 12 that, when a new UN 3 is connected to a U-plane device 2, acquire node information relating to the UN 3, extract the search key information of the UN 3 based on the acquired node information and the designation information stored using the storage unit 10, and set a transmission destination of a packet for each U-plane device 2 in a case in which extracted search key information is included in a packet part indicated by part information, which is stored using the storage unit 10, of the packet received by the U-plane device 2 at the time of packet relaying.

By employing such a configuration, when a new UN 3 is connected to a U-plane device 2, the transmission destination of a packet is set for each U-plane device 2 in a case in which the search key information of the UN 3 based on designation information stored using the storage unit 10 is included in a packet part indicated by the part information, which is stored using the storage unit 10, of the packet that is received by the U-plane device 2 at the time of packet relaying. In other words, a transmission destination of a packet for each U-plane device 2 can be set on the basis of the designation information and the part information stored using the storage unit 10. In this way, for example, when designation information and part information designated by a network company are stored using the storage unit 10, path control can be performed using the designation information and the part information designated by the network company. In other words, more flexible path control can be performed.

In addition, in the C-plane device 1 according to this embodiment, the setting unit 12 may extract a plurality of pieces of search key information when the search key information is extracted and set a transmission destination for each of the extracted plurality of pieces of the search key information. By employing such a configuration, a plurality of pieces of search key information can be set for a UN 3, and thus, for example, more flexible path control such as setting a plurality of pieces of search key information in accordance with purposes and setting path control according to a purpose can be performed.

In addition, in the C-plane device 1 according to this embodiment, the setting unit 12 may dynamically generate insufficiency information when search key information is extracted. By employing such a configuration, search key information can be extracted more reliably even in a case in which insufficiency information is present, and accordingly, a transmission destination of the U-plane device 2 can be set more reliably.

In addition, in the C-plane device 1 according to this embodiment, the storage unit 10 may further store topology information relating to a network topology of one or more U-plane devices 2, and the setting unit 12 may set a transmission destination on the basis of the topology information stored using the storage unit 10. By employing such a configuration, for example, a transmission destination forming a shortest path toward a transmission destination UN 3 can be set on the basis of the topology information, and more efficient path control can be performed.

In addition, in the C-plane device 1v according to this embodiment, packet communication may be performed through one virtual network among a plurality of virtual networks established on a path, the storage unit 10v may store designation information and part information for each virtual network, and the acquisition unit 11v and the setting unit 12v, when a new UN 3v is connected to a U-plane device 2v, may acquire node information relating to the UN 3v, extract search key information of the UN 3v for each virtual network, on the basis of the acquired node information and the designation information for each virtual network that is stored using the storage unit 10v, and set a transmission destination of a packet for each virtual network and for each U-plane device 2v in a case in which the extracted search key information of the virtual network is included in a packet part indicated by part information of the packet received by the U-plane device 2v at the time of relaying the packet, which is stored using the storage unit 10v, for each virtual network. By employing such a configuration, in a packet communication network in which a plurality of virtual networks are established on a path, path control for each virtual network can be performed. In other words, more flexible path control can be performed.

In addition, in the path control system 4 according to this embodiment, the setting unit 12 may generate a settings data table and transmit the generated settings data table to each U-plane device 2, and the U-plane device 2 comprises: the storage unit 20 that stores a settings data table transmitted by the setting unit 12; and the transmission unit 22 that transmits a packet received at the time of relaying on the basis of the settings data table stored using the storage unit 20. By employing such a configuration, in the U-plane device 2, the generated settings data table is stored, and a packet received at the time of relaying is transmitted on the basis of the stored settings data table. In other words, a packet is transmitted in the U-plane device 2 on the basis of the settings data table generated on the basis of the designation information and the part information stored using the storage unit 10 of the C-plane device 1. In this way, for example, when designation information and part information designated by a network company are stored using the storage unit 20, path control can be performed using the designation information and the part information designated by the network company. In other words, more flexible path control can be performed.

Here, as a problem of a conventional technology, there is a problem in that an EPS that is a standard of a mobile communication network cannot perform path control using an ID designated by a network company and a value of a packet field designated by the network company. According to the path control system 4 of this embodiment, a packet search rule table including a set of an ID designated by a network company and a packet field designated by the network company is maintained by the C-plane device 1 that is a device responsible for controlling the network, and a settings data table relating to path control generated by combining the packet search rule table and UN user specific information is transmitted to the U-plane device 2 that is a device responsible for packet transmission and packet processing of the network. In this way, path control (ID routing) using an ID (search key information or designation information) designated by a network company and a packet field (part information) designated by the network company can be realized. For example, path control inside a mobile network can be realized using an arbitrary network protocol other than an Internet protocol (IP). In addition, the configuration of the path control system 4 according to this embodiment can be applied to software defined networking (SDN), network function virtualization (NFV), a transport, a link, a node, a mobile core, a base station, and the like.

Here, "information" described in this specification may be represented using any one of other various technologies. For example, data, a direction, a command, information, a signal, a bit, a symbol, a chip, and the like acquired as described over the description presented above may be represented using a voltage, a current, an electromagnetic wave, a magnetic field or a magnetic particle, a photo field or a photon, or an arbitrary combination thereof.

A term "determining" used in this specification includes various operations of various kinds. "Judging" or "deciding" for example, may include calculating, computing, processing, deriving, investigating, looking up (for example, a search in a table, a database, or another data structure), ascertaining, and the like. In addition, "determining" may include receiving (for example, reception of information), accessing (for example, an access to data included in a memory), or the like. Furthermore, "determining" may include resolving, selecting, choosing, establishing, comparing, and the like.

A term "connected" or any modification thereof means a direct or indirect connection or combination of any kind between two or more elements and may include presence of one or more intermediate elements between two elements that are "connected" to each other. The combination or connection between elements may be a physical combination or connection, a logical combination or connection, or a physical and logical combination thereof. In the case of being used in this specification, two elements may be considered as being "connected" to each other by using one or more wires, cables, and/or a print electric connection and by using electromagnetic energy such as electromagnetic energy having a wavelength of a radio frequency region, a micro wave region, and a light (both visible light and invisible light) region as one non-limiting and non-inclusive example.

Description of "on the basis of" used in this specification does not mean "on the basis of only" unless otherwise described clearly. In other words, description of "on the basis of" means both "on the basis of only" and "on the basis of at least."

As long as "including" and a modification thereof are used in this specification or the claims, these terms are intended to be inclusive similar to a term "being equipped with." In addition, a term "or" used in this specification or the claims is intended not to be exclusive OR.

In the processing order of each aspect/embodiment, a sequence diagram, a flowchart, and the like described in this specification, the order may be changed as long as there is no contradiction. For example, for a method described in this specification, elements of various steps are presented in an exemplary order, the order is not limited to the presented specific order.

Aspects/embodiments described in this specification may be used independently, be combined to be used, or be used to be switched over in accordance with the execution. In addition, a notification (for example, a notification of "being X") of predetermined information is not limited to be performed explicitly and may be performed implicitly (for example, a notification of predetermined information is not performed).

As above, while the present invention has been described in detail, it is apparent to a person skilled in the art that the present invention is not limited to the embodiments described in this specification. The present invention may be modified or changed without departing from the concept and the scope of the present invention set in accordance with the claims. Thus, the description presented in this specification is for the purpose of exemplary description and does not have any limited meaning for the present invention.

REFERENCE SIGNS LIST

1 C-plane device
2 U-plane device
3 UN
4 Path control system
10 Storage unit
11 Acquisition unit
12 Setting unit
20 Storage unit 21 Connection processing unit
22 Transmission unit

The invention claimed is:

1. A control node, which is a control plane (C-plane) device, in a path control system comprising the control node performing path control of packet communication between nodes and one or more relay nodes that are connected to the control node and relay the packet communication, the control node comprising:
a memory storing (i) designation information designating search key information of a node used as a search key determining a transmission destination that is a relay destination when one of the one or more relay nodes receives a packet and (ii) part information indicating a packet part, which is an indication of a number of bits from a first bit position to a second bit position of a packet in which the search key information is included, the part information being input in advance to the control node,
wherein the control node,
in a case in which a new node is connected to at least one of the one or more relay nodes,
acquires node information relating to the new node,
extracts search key information of the new node on the basis of the acquired node information and the designation information stored in the memory, and,
in a case in which, in a packet received by at least one relay node among the one or more relay nodes, the search key information of the new node is included in a packet part indicated by the part information,
sets a transmission destination of the packet for at least a part of the one or more relay nodes or each of all the relay nodes in a transmission path of the packet transmission.

2. The control node according to claim 1, wherein a plurality of pieces of search key information are extracted when the search key information is extracted, and a transmission destination is set for each of the plurality of pieces of extracted search key information.

3. The control node according to claim 1, wherein insufficiency information is dynamically generated when the search key information is extracted.

4. The control node according to claim 1,
wherein the memory further stores topology information relating to network topology of the one or more relay nodes, and
wherein the control node sets a transmission destination on the basis of the topology information stored in the memory.

5. The control node according to claim 1,
wherein the packet communication is performed through one virtual network among a plurality of virtual networks established on a path,
wherein the memory stores designation information and part information for each of the virtual networks, and
wherein the control node,
in a case in which the new node is connected to at least one of the one or more relay nodes,
acquires node information relating to the new node,
extracts search key information for each virtual network of the new node on the basis of the acquired node information and the designation information for each virtual network stored in the memory, and,
in a case in which, in a packet received by at least one relay node among the one or more relay nodes, the search key information for the virtual network of the new node is included in a packet part indicated by the part information for each virtual network,
sets a transmission destination of the packet for each virtual network and for at least a part of the one or more relay nodes or each of all the relay nodes in a transmission path of the packet transmission.

6. The control node according to claim 2, wherein insufficiency information is dynamically generated when the search key information is extracted.

7. A path control system comprising:
a control node, which is a control plane (C-plane) device, performing path control of packet communication between nodes; and
one or more relay nodes that are connected to the control node and relay the packet communication,
wherein the control node comprises a first memory storing (i) designation information designating search key information of a node used as a search key determining a transmission destination that is a relay destination when one of the one or more relay nodes receives a packet and (ii) part information indicating a packet part, which is an indication of a number of bits from a first bit position to a second bit position of a packet in which the search key information is included, the part information being input in advance to the control node and, in a case in which a new node is connected to at least one of the one or more relay nodes,
acquires node information relating to the new node,
extracts search key information of the new node on the basis of the acquired node information and the designation information stored in the first memory, and,
in a case in which, in a packet received by at least one relay node among the one or more relay nodes, the search key information of the new node is included in a packet part indicated by the part information,
generates a settings data table in which a transmission destination of the packet is set for at least a part of the one or more relay nodes or for each of all the relay nodes in a transmission path of the packet transmission and transmits the generated settings data table to a determined relay node, from among the at least a part of the one or more relay nodes or for each of all the relay nodes in a transmission path of the packet transmission, and
wherein the determined relay node comprises a second memory storing the settings data table transmitted by the control node and transmits a packet received at the time of relaying on the basis of the settings data table stored in the second memory.

* * * * *